(12) United States Patent
Hotta et al.

(10) Patent No.: US 6,851,408 B2
(45) Date of Patent: Feb. 8, 2005

(54) DIRECT FUEL INJECTION ENGINE

(75) Inventors: Isamu Hotta, Yokohama (JP); Koji Hiraya, Yokohama (JP); Masaaki Kubo, Yokohama (JP); Akihiko Kakuho, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/694,013

(22) Filed: Oct. 28, 2003

(65) Prior Publication Data

US 2004/0123833 A1 Jul. 1, 2004

(30) Foreign Application Priority Data

Dec. 25, 2002 (JP) .................................... 2002-374874
Feb. 3, 2003 (JP) .................................... 2003-025914

(51) Int. Cl.[7] .............................................. F02B 17/00
(52) U.S. Cl. ..................... 123/305; 123/279; 123/295
(58) Field of Search ............................ 123/295, 299, 123/300, 305, 306, 406.35, 279, 276

(56) References Cited

U.S. PATENT DOCUMENTS

| 6,336,436 B1 | * | 1/2002 | Miyakubo et al. | 123/295 |
| 6,386,177 B2 | * | 5/2002 | Urushihara et al. | 123/299 |
| 6,401,688 B2 | * | 6/2002 | Teraji et al. | 123/295 |
| 6,425,367 B1 | * | 7/2002 | Hiraya et al. | 123/299 |
| 6,470,850 B1 | * | 10/2002 | Sasaki et al. | 123/305 |
| 6,622,690 B2 | * | 9/2003 | Ando et al. | 123/295 |
| 6,651,615 B2 | * | 11/2003 | Suzuki et al. | 123/305 |
| 6,739,309 B2 | * | 5/2004 | Hiraya et al. | 123/279 |
| 2003/0089331 A1 | * | 5/2003 | Ueda et al. | 123/295 |
| 2003/0221658 A1 | * | 12/2003 | Hiraya et al. | 123/279 |

FOREIGN PATENT DOCUMENTS

| EP | 1223329 | * | 7/2002 | ........... F02D/41/40 |
| JP | 08-177684 A | | 7/1996 | |
| JP | 11-082028 A | | 3/1999 | |
| JP | 2000-303936 A | | 10/2000 | |
| JP | 1555780 | * | 5/2002 | ........... F02D/41/02 |
| JP | 332934 | * | 11/2002 | ........... F02M/61/18 |
| JP | 49691 | * | 2/2003 | ........... F02D/43/00 |

* cited by examiner

*Primary Examiner*—Hai Huynh
(74) *Attorney, Agent, or Firm*—Shinjyu Global IP Counselors, LLP

(57) ABSTRACT

An direct fuel injection spark ignition internal combustion engine comprises a fuel injection valve arranged at a substantially center part of an upper are of a combustion chamber, and a piston having a crown surface with a cavity shaped so that a center axis of a substantially conical-shaped fuel stream injected from the fuel injection valve is substantially coincident with a center axis of the piston. In a low-load stratified combustion operating region when spark ignition is executed, the fuel injection angle is increased to form a first combustible air-fuel mixture before the fuel stream collides against the cavity of the piston crown surface. In a high-load stratified combustion operating region, the fuel injection angle is reduced to form a second combustible air-fuel mixture after the fuel stream collides against the cavity of the piston crown surface.

16 Claims, 16 Drawing Sheets

Distribution Of Air-Fuel Mixture In Region A

Distribution Of Air-Fuel Mixture In Region B

Distribution Of Air-Fuel Mixture In Region C

DISTRIBUTION OF AIR-FUEL MIXTURE IN REGION A

DISTRIBUTION OF AIR-FUEL MIXTURE IN REGION B

DISTRIBUTION OF AIR-FUEL MIXTURE IN REGION C

DISTRIBUTION OF AIR-FUEL MIXTURE IN REGION A

DISTRIBUTION OF AIR-FUEL MIXTURE IN REGION B (B1)

DISTRIBUTION OF AIR-FUEL MIXTURE IN REGION B (B2)

DISTRIBUTION OF AIR-FUEL MIXTURE IN REGION C

DISTRIBUTION OF AIR-FUEL MIXTURE IN REGION A

DISTRIBUTION OF AIR-FUEL MIXTURE IN REGION B

DISTRIBUTION OF AIR-FUEL MIXTURE IN REGION C

DISTRIBUTION OF AIR-FUEL MIXTURE IN REGION A

DISTRIBUTION OF AIR-FUEL MIXTURE IN REGION B

DISTRIBUTION OF AIR-FUEL MIXTURE IN REGION C

DISTRIBUTION OF AIR-FUEL MIXTURE WITHOUT COUNTERBORE

DISTRIBUTION OF AIR-FUEL MIXTURE WITH COUNTERBORE

DIRECT FUEL INJECTION ENGINE

BACKGROUND OF THE INVENTION

1. Field of the Invention

The present invention generally relates to a spark ignition internal combustion engine with direct fuel injection. More specifically, the present invention relates to a spark ignition internal combustion engine with direct fuel injection that achieves an improved combustibility of the fuel during stratified combustion.

2. Background Information

A spark ignition internal combustion engine with direct fuel injection is configured and arranged to perform a highly lean combustion by directly injecting a fuel into a cylinder from a fuel injection valve and forming a stratified air-fuel mixture in the cylinder during spark ignition combustion. Thus, with the direct fuel injection engine, the fuel consumption can be significantly reduced, particularly when the engine is operating under low and medium loads.

In order to steadily ignite and combust the air-fuel mixture in the direct fuel injection engine, it is critical to reliably form an air-fuel mixture mass in a stratified state in the cylinder, which has an appropriate size and appropriate air-fuel ratio according to the speed and load of the engine.

An appropriate stratified air-fuel mixture can be formed in the cylinder by providing a bowl-shaped cavity on a piston, setting a fuel stream injected from the fuel injection valve to collide against a wall surface of the bowl-shaped cavity, and forming a fuel stream circulation along the wall surface of the bowl-shaped cavity. For example, Japanese Laid-Open Patent Publication No. 11-82028 discloses a direct fuel injection spark ignition internal combustion engine that forms an appropriate stratified air-fuel mixture in a cylinder by disposing the fuel injection valve in the vicinity directly above the cavity, setting the fuel stream to collide against the cavity perimeter wall surface, and thereby forming a fuel stream circulation toward the center part of the cavity.

In view of the above, it will be apparent to those skilled in the art from this disclosure that there exists a need for an improved spark ignition internal combustion engine with direct fuel injection. This invention addresses this need in the art as well as other needs, which will become apparent to those skilled in the art from this disclosure.

SUMMARY OF THE INVENTION

With a spark ignition internal combustion engine with direct fuel injection, it is important to control the size of the air-fuel mixture mass in order to maintain the air-fuel ratio of the air-fuel mixture mass at the so-called ideal or stoichiometric air-fuel ratio under various load conditions of the engine. However, in the case of using the above mentioned conventional direct fuel injection spark ignition internal combustion engine that principally utilizes a cavity to form a stratified air-fuel mixture, it is difficult to vary the cavity volume in accordance with the various loads. Therefore, with the conventional direct fuel injection spark ignition internal combustion engine, the air-fuel ratio of the air-fuel mixture mass becomes too lean when the engine is operating in a low-load condition and too rich when the engine is operating in a high-load condition.

The present invention considers the abovementioned problems, and has the object to enable forming of an air-fuel mixture mass of an appropriate air-fuel ratio and size according to the operating conditions of the engine in a combustion chamber having a fixed-volume cavity.

Accordingly, in order to achieve the above object, a direct fuel injection engine is provided that basically comprises a combustion chamber, a spark plug, a fuel injection valve, a piston and a controller. The spark plug is positioned in an upper surface of the combustion chamber. The fuel injection valve is positioned in a substantially center portion of the upper surface of the combustion chamber, the fuel injection valve being configured and arranged to directly inject a fuel stream inside the combustion chamber. The piston has a guide wall surface being configured and arranged to guide the fuel stream injected from the fuel injection valve. The controller is configured and arranged to control operations of the spark plug and the fuel injection valve. The controller is further configured and arranged to ignite a first air-fuel mixture formed directly after the fuel stream is injected from the fuel injection valve and prior to a majority of the fuel stream being guide by the guide wall surface of the piston when the direct fuel injection engine is operating in a low-load stratified combustion region. The controller is further configured and arranged to ignite a second air-fuel mixture formed after a majority of the fuel stream is guided to an upper portion of the combustion chamber by the guide wall surface of the piston when the direct fuel injection engine is operating in a high-load stratified combustion region.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4($b$) is a diagrammatic cross-sectional view of a combustion chamber illustrating distribution of the air-fuel mixture in the combustion chamber under a low-load stratified combustion region shown as "A" in FIG. 4($a$);

FIG. 4($c$) is a diagrammatic cross-sectional view of a combustion chamber illustrating distribution of the air-fuel mixture in the combustion chamber under a high-load stratified combustion region shown as "B" in FIG. 4($a$);

FIG. 4($d$) is a diagrammatic cross-sectional view of a combustion chamber illustrating distributions of the air-fuel mixture in the combustion chamber under a homogeneous combustion region shown as "C" in FIG. 4($a$);

FIGS. 15(a) and 15(b) is a diagrammatic view of the combustion chamber illustrating an air-fuel mixture distribution without a counterbore in the vicinity of the fuel injection valve.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
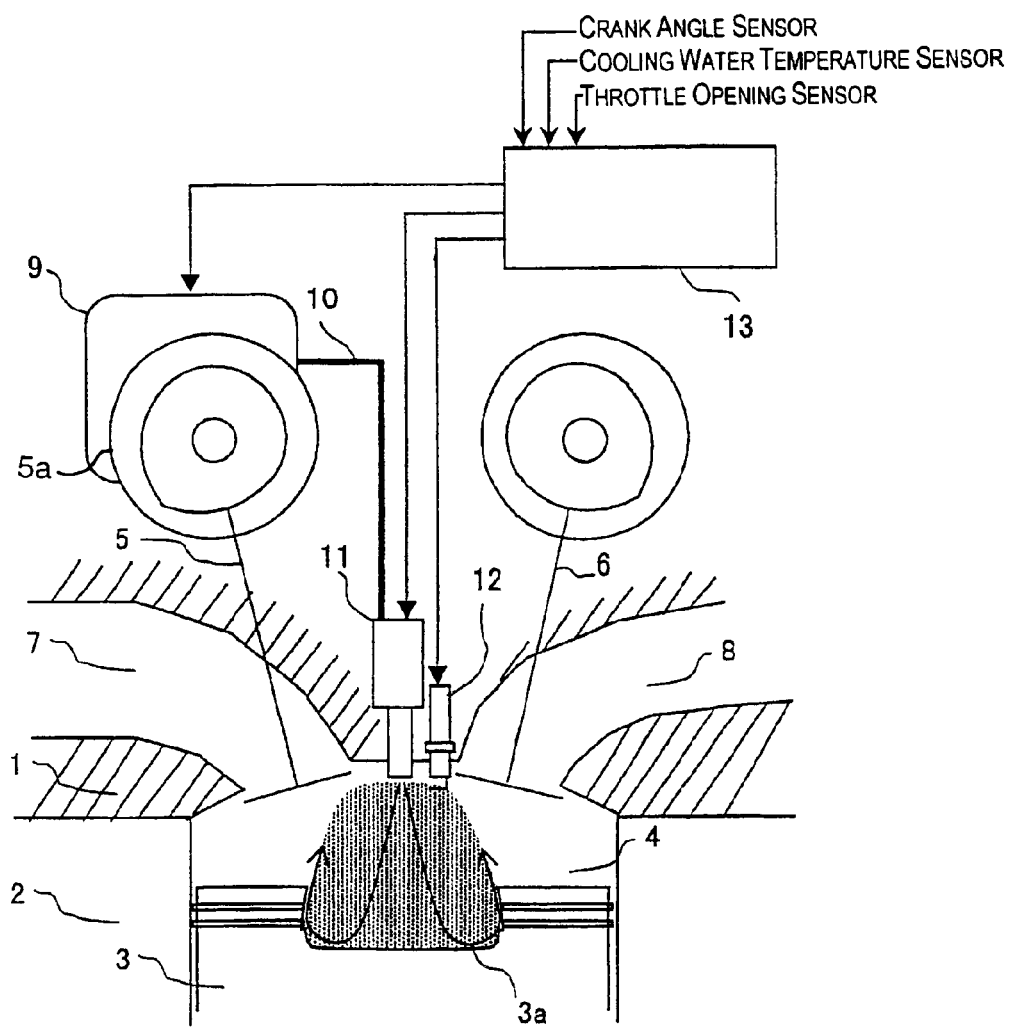
FIG. 1 is a partial cross-sectional view of an injection portion of a direct fuel injection spark ignition internal combustion engine in accordance with a first embodiment of the present invention.

Referring initially to FIG. 1, a spark ignition internal combustion engine with direct fuel injection (herein after referred to as "direct fuel injection engine") is illustrated in accordance with a first embodiment of the present invention. FIG. 1 is a partial cross-sectional view of an injection portion of the direct fuel injection engine of the first embodiment. As seen in FIG. 1, the injection portion of the direct fuel injection engine includes a cylinder head 1, a cylinder block 2, a piston 3, at least one intake valve 5, at least one exhaust valve 6, at least one intake port 7, at least one exhaust port 8, a fuel injection valve 11 and a spark plug 12. A combustion chamber 4 is basically defined by the cylinder head 1, the cylinder block 2 and the piston 3. New air is introduced into the combustion chamber 4 from the intake port 7 via the intake valve 5, while exhaust gas is exhausted from the exhaust port 8 via the exhaust valve 6. A fuel pump 9 is disposed at the end of the camshaft which drives the intake valve 5. Of course, it will be apparent to those skilled in the art from this disclosure that the fuel pump 9 can be arranged to be driven by a separately arranged electric motor. Moreover, a variably valve timing mechanism 5a is preferably used to control a valve timing of the intake cam. Variably valve timing mechanism are well known in the art, and thus, the variably valve timing mechanism 5a will not be discussed or illustrated in detail herein.

As seen in FIG. 1, the fuel injection valve 11 is positioned in a substantially center portion of an upper surface of the combustion chamber 4. In other words, the fuel injection valve 11 is preferably centered or substantially centered on the center longitudinal axis of the piston 3. The fuel injection valve 11 is configured and arranged to inject the fuel pressurized by the fuel pump 9 and conveyed via a fuel conduit 10 into the combustion chamber 4. The fuel injection valve 11 is preferably configured and arranged such that the fuel stream injected from the fuel injection valve 11 spreads in a substantially conical shape in the combustion chamber 4. Moreover, in the first embodiment of the present invention, the fuel injection valve 11 is configured and arranged to inject a fuel stream in at least two different fuel injection angles, i.e., angles of an apex of the conical-shaped fuel stream, by changing a lift of a needle valve of the fuel injection valve 11.

Figure 2:
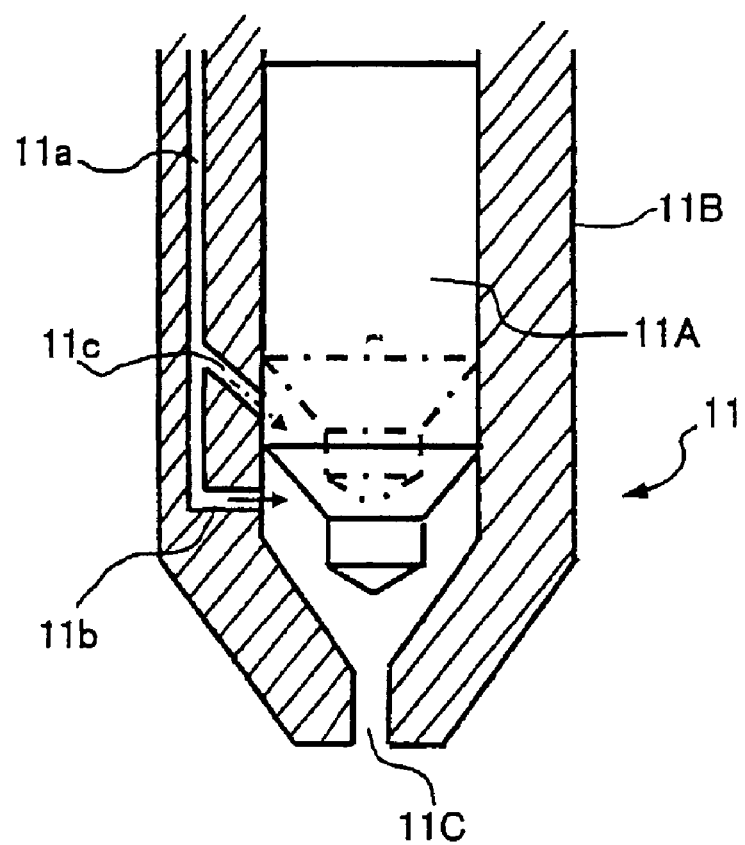
FIG. 2 is a partial cross-sectional view of one example of a fuel injection valve with a controllable fuel injection angle in accordance with the first embodiment of the present invention.

One example of the fuel injection valve 11 utilizing a needle valve is disclosed in Japanese Laid Open Patent Publication No. H8-177684. As shown in FIG. 2, the fuel injection valve 11 includes a needle valve 11A and a valve body 11B in which the needle valve 11A is inserted. The valve body 11B also includes a nozzle hole 11C. A fuel passageway 11a is formed in the valve body 11B. The downstream end of the fuel passageway 11a is branched into a lower side wide angle spout 11b and a narrow angle spout 11c. The wide angle spout 11b is arranged to be perpendicular to the axial direction of the needle valve 11A. The narrow angle spout 11c is inclined downwardly toward the nozzle hole 11C. With the fuel injection valve 11 shown in FIG. 2, when a lift of the needle valve 11A is small, only the wide angle spout 11b opens. Thus, the fuel spouted from the wide angle spout 11b forms a strong swirl in a space inside the valve body 11B wherein the needle valve 11A moves, and is injected in a substantially conical shape from the nozzle hole 11C into the combustion chamber 4. On the other hand, when the lift of the needle valve 11A is large, the wide angle spout 11b and the narrow angle spout 11c both open. Thus, the swirl of the fuel spouted from the wide angle spout 11b is weakened by the force of the fuel flow spouted from the downwardly inclined narrow angle spout 11c toward the nozzle hole 11C. Thus, when the lift of the needle valve 11A is large, the fuel injection angle of the fuel stream injected from the fuel injection valve 11 is smaller than the fuel injection angle of the fuel stream injected from the fuel injection valve 11 when the lift of the needle valve 11A is small. Accordingly, the injection angle of the conically spreading fuel stream from the nozzle hole 11C increases comparatively when the lift of the needle valve 11A is small, opening only the wide angle spout 11b, and decreases comparatively when the lift of the needle valve 11A is large, opening both the wide angle spout 11b and the narrow angle spout 11c.

Figure 3:
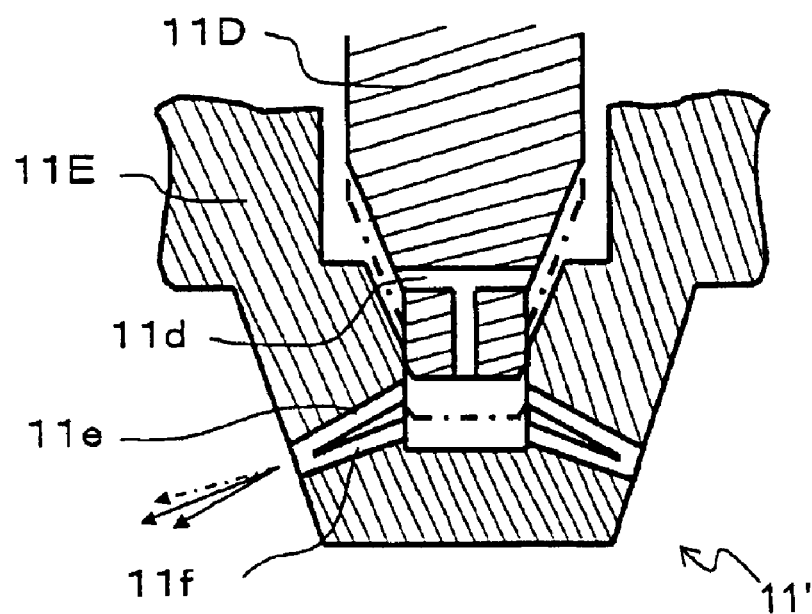
FIG. 3 is a partial cross-sectional view of another example of a fuel injection valve with a controllable fuel injection angle in accordance with the first embodiment of the present invention.

Alternatively, a fuel injection valve 11' can be substituted with the fuel injection valve 11 in the direct fuel injection engine of the first embodiment. More specifically, the fuel injection valve 11' is configured and arranged as disclosed in Japanese Laid Open Patent Publication No. 2000-303936. As shown in FIG. 3, the fuel injection valve 11' basically comprises a needle valve 11D and a valve body 11E. A T-shaped fuel passageway 11d is formed in the needle valve 11D. An upper narrow angle nozzle 11e and a lower wide angle nozzle 11f are formed in a valve body 11E. The upper narrow angle nozzle 11e has a large downwardly angled injection angle, and the lower wide angle nozzle 11f has a small downwardly angled injection angle. When the lift of the needle valve 11D is small, only the wide angle nozzle 11f opens. Thus, the fuel is injected from the wide angle nozzle 11f at a small downwardly angled injection angle into the combustion chamber 4. When the lift of the needle valve 11D is large, both the wide angle nozzle 11f and the narrow angle nozzle 11e open. Thus, the fuel is urged with a downwardly directed injection force by the fuel injected from the narrow angle nozzle 11e, and thus, the fuel injection angle from the fuel injection valve 11' is relatively small. Accordingly, with the fuel injection valve 11', the injection angle is comparatively large when the lift of the needle valve 11D is small, opening only the wide angle nozzle 11f, and is relatively small when the lift of the needle valve 11D is large, opening both the wide angle nozzle 11f and the narrow angle nozzle 11e.

Of course, it will be apparent to those skilled in the art from this disclosure that a construction of the fuel injection valve 11 is not limited to the above mentioned examples. Rather, any construction of the fuel injection valve 11 can be utilized provided that the fuel injection valve 11 is adopted to carry out the same functions in the present invention. More specifically, in the first embodiment of the present invention, any construction of the fuel injection valve 11 can be utilized as long as the fuel injection valve 11 is arranged to inject the fuel into the combustion chamber 4 in at least two different fuel injection angles.

As shown in FIG. 1, the piston 3 of the direct fuel injection engine includes a bowl-shaped cavity 3a on the piston crown surface which is a position opposite the fuel injection valve 11. When the direct fuel injection engine is operating in a high-load stratified combustion region, the fuel injected from the fuel injection valve 11 principally forms a stratified air-fuel mixture mass within the cavity 3a and in the upper space of the cavity 3a. The cavity 3a is defined by a guide wall surface comprising a bottom surface and a peripheral wall surface that curves upwardly from the bottom surface of the cavity 3a and is angled inwardly towards the center axis of the piston 3 at its upper end section. Thus, the bottom surface and the peripheral wall surface of the cavity 3a are shaped so that the fuel stream collided against the cavity 3a is oriented toward the substantially upper center part of the combustion chamber 4, which includes the spark plug 12. Specifically, the shape of the peripheral wall surface of the cavity 3a is curved generally toward the fuel injection valve 11, and formed so that the edge peripheral wall surface is oriented at an angle formed between the cylinder axis and the approximate direction in which the fuel stream is injected from the fuel injection valve 11. Therefore, the fuel stream collided against the cavity 3a wall spreads outwardly beyond the outer edge of the initial fuel stream from the fuel injection valve 11 to the outside of the cavity 3a, but the spread can be accumulated on the approximately inner side of the space above the cavity 3a, and it is possible to form the stratified combustible air-fuel mixture because excessive diffusion of the air-fuel mixture is suppressed.

Then, the spark plug 12 is configured and arranged to ignite and combust the air-fuel mixture. As seen in FIG. 1, the spark plug 12 is positioned in the upper surface of the combustion chamber 4 and is located adjacent the fuel injection valve 11.

The direct fuel injection engine of the present invention is controlled in an integrated manner by a controller or engine control unit (ECU) 13. Moreover, the direct fuel injection engine of the present invention includes various sensors that monitor an operating condition of the vehicle, such as a crank angle sensor, a cooling water temperature sensor and a throttle opening sensor. More specifically, a crank angle sensor signal, a cooling water temperature signal, and a throttle opening signal are input to the ECU 13, and the ECU 13 is configured to perform the above mentioned various control functions, such as control of the needle valve 11A of the fuel injection valve 11 and control of the spark plug 12, based the above mentioned input signals.

The ECU 13 preferably includes a microcomputer with a control program that controls the direct fuel injection engine as discussed below. The ECU 13 can also include other conventional components such as an input interface circuit, an output interface circuit, and storage devices such as a ROM (Read Only Memory) device and a RAM (Random Access Memory) device. The microcomputer of the ECU 13 is programmed to control the direct fuel injection engine. The memory circuit stores processing results and control programs that are run by the processor circuit. The ECU 13 is operatively coupled to the various components of the direct fuel injection engine in a conventional manner. The internal RAM of the ECU 13 stores statuses of operational flags and various control data. The ECU 13 is capable of selectively controlling any of the components of the control system in accordance with the control program. It will be apparent to those skilled in the art from this disclosure that the precise structure and algorithms for the ECU 13 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The direct fuel injection engine of the present invention is configured and arranged to perform combustion of the air-fuel mixture in a stratified combustion mode or a homogeneous combustion mode depending on an operating condition of the direct fuel injection engine. In the stratified combustion mode, a relatively small amount of fuel is injected during a compression stroke (particularly in the latter half of the compression stroke) to form a stratified fuel-air mixture mass to improve fuel economy through lean operation. Since the stratified fuel-air mixture is formed with the surrounding area in the combustion chamber 4 being occupied by air, stable combustion is accomplished even with the relatively small amount of fuel. On the other hand, in the homogeneous combustion mode, the fuel is injected during an intake stroke (particularly in the former half of the intake stroke) to perform a stoichiometric operation (stoichiometric air-fuel ratio operation). Thus, a homogeneous fuel-air mixture is formed throughout the combustion chamber 4. Since the air and the fuel are mixed thoroughly before the combustion occurs, high power output can be obtained in the homogeneous combustion.

Figure 4A:
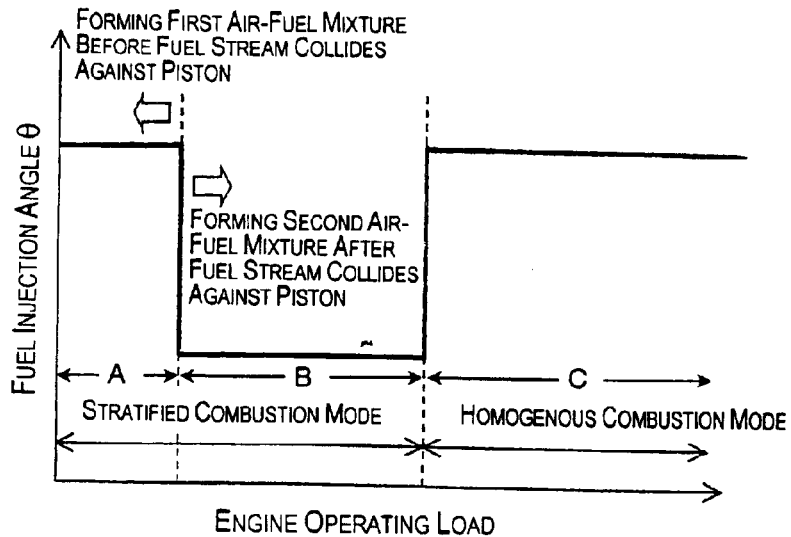
FIG. 4($a$) is a diagrammatic chart illustrating the relationship between the engine operating load and the fuel stream angle in accordance with the first embodiment of the present invention.
Figure 4B:
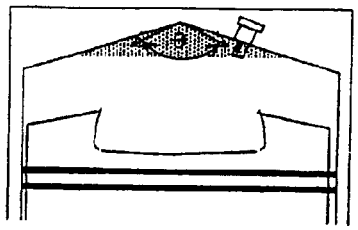
Figure 4C:
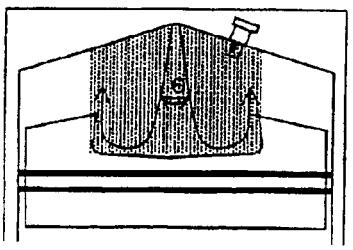
Figure 4D:
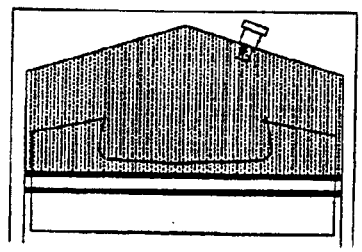

FIG. 4(a) is a diagrammatic chart showing the relationship between the operating condition (load) and the fuel injection angle of the fuel stream injected from the fuel injection valve 11. FIGS. 4(b)–4(d) show the distribution of the air-fuel mixture in the combustion chamber 4 under various operating loads with the reference to the loads shown in FIG. 4(a).

The operating load is generally divided into a low-load stratified combustion region shown as "A" in FIG. 4(a), a high-load stratified combustion region shown as "B" in FIG. 4(a), and a homogeneous combustion region shown as "C" in FIG. 4(a). Generally, the amount of fuel injected during the low-load stratified combustion region A is small. If the fuel injection angle is set to be relatively small so that the injected fuel stream collides against the wall surface of the cavity 3a, the fuel stream will be highly diffused in the cavity 3a and above the cavity 3a. However, since the amount of fuel injected in the low-load stratified combustion region A is small, a lean air-fuel mixture will be formed having poor ignitability and combustion stability if the fuel stream is diffused after the fuel stream collides against the cavity 3a. Thus, in the first embodiment of the present invention, the fuel injection valve 11 is configured and arranged to set the fuel injection angle such that a combustible air-fuel mixture is formed in the combustion chamber 4 before the fuel stream collides against the cavity 3a in the low-load stratified combustion region A. More specifically, the fuel injection valve 11 is configured and arranged to set the injection angle of the fuel stream to be relatively large in the low-load stratified combustion region A as seen in FIG. 4(a). Accordingly, a first air-fuel mixture that is close to stoichiometric state is formed in the upper center portion of the combustion chamber 4 where the spark plug 12 is located before the fuel stream collides against the wall surface of the cavity 3a, as shown in FIG. 4(b). As used herein, the first air-fuel mixture is a combustible air-fuel mixture that is close to the stoichiometric state formed in the combustion chamber 4 relatively immediately after the fuel stream is injected from the fuel injection valve 11. The first air-fuel mixture has a superior ignitability and combustion stability in the low-load stratified combustion region A. In other words, in the first embodiment of the present invention, the fuel stream injected from the fuel injection valve 11 is arranged to directly reach a plug gap of the spark plug 12 and form the first air-fuel mixture in the upper portion of the combustion chamber 4 in the low-load stratified combustion region A. Thus, the spark plug 12 is configured and arranged to ignite the first air-fuel mixture relatively immediately after the fuel is injected from the fuel injection valve 11 when the direct fuel injection engine is operating in the low-load stratified combustion region A.

On the other hand, the amount of the fuel injected from the fuel injection valve 11 in the high-load stratified combustion region B is larger than the amount of fuel injected in the low-load stratified combustion region A. Under such condition, if the fuel stream is oriented directly toward the vicinity of a plug gap of the spark plug 12, an excessively rich air-fuel mixture is formed in the upper part of the combustion chamber, and wet fouling or dry fouling of the spark plug 12 will occur. Thus, as seen in FIG. 4(a), the fuel injection angle is set relatively small under the high-load stratified combustion region B. Accordingly, the fuel stream collides against the wall surface of the cavity 3a, and becomes highly diffused in the cavity 3a and the upper space of the cavity 3a, as seen in FIG. 4(c). Therefore, a second air-fuel mixture that is close to a stoichiometric state can be formed after the fuel stream collides against the cavity 3a in the high-load stratified combustion region B. As used herein the second air-fuel mixture is a combustible air-fuel mixture close to the stoichiometric state formed after the fuel stream injected from the fuel injection valve 11 collides against the cavity 3a and is guided toward the upper portion of the combustion chamber 4. Thus, the second air-fuel mixture is formed within the cavity 3a and thereabove where the spark plug 12 is located and has a superior ignitability and combustion stability. In other words, in the first embodiment of the present invention, the fuel stream injected from the fuel injection valve 11 is arranged to reach the spark plug 12 and form the second air-fuel mixture after the fuel stream collides against the cavity 3a and is guided toward the upper portion of the combustion chamber 4. Accordingly, the spark plug 12 is configured and arranged to ignite the second air-fuel mixture after the fuel stream collides the wall surface of the cavity 3a and the fuel stream is guided to the upper portion of the combustion chamber 4 by the wall surface of the cavity 3a when the internal combustion engine is operating in a high-load stratified combustion region B. Since the fuel stream is not directly oriented toward the spark plug 12 after the fuel stream is injected from the fuel injection valve 11, the wet fouling or dry fouling of the spark plug 12 is prevented.

In the homogeneous combustion region C, a homogeneous air-fuel mixture fills the combustion chamber 4, as seen in FIG. 4(d). In the first embodiment of the present invention, the fuel injection angle in the homogeneous combustion mode is preferably set to a relatively large angle as shown in FIG. 4(a). However, it is apparent to those skilled in the art from this disclosure that the fuel injection angle in the homogeneous combustion region C is not limited to the angle shown in FIG. 4(a). Rather, the fuel injection angle in the homogeneous combustion region C can be set to any angle as long as the air-fuel mixture that achieves the homogeneous combustion can be formed in the combustion chamber 4 as shown in FIG. 4(d) to carry out the present invention.

Figure 5A:
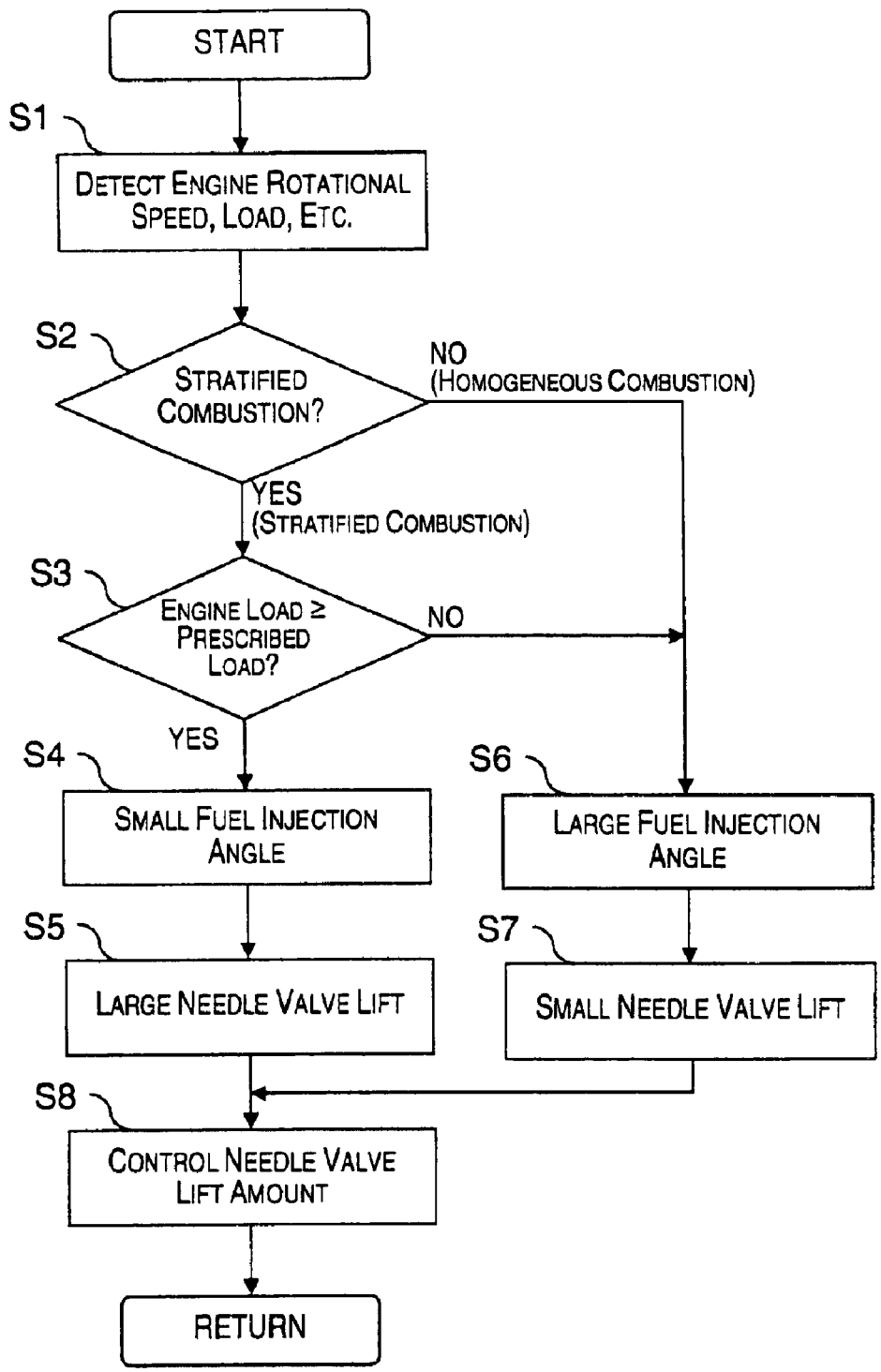
FIG. 5($a$) is a flow chart of the control executed in a controller of the direct fuel injection engine in accordance with the first embodiment of the present invention.
FIG. 5(b) is a flow chart of an alternate control executed in the controller of the direct fuel injection engine in accordance with the first embodiment of the present invention.

As described above, the fuel injection angle of the fuel stream injected from the fuel injection valve 11 is controlled in accordance with the load of the direct fuel injection engine. When the load is relatively low, the diffusion of the fuel stream is suppressed and a comparatively small air-fuel mixture mass is formed by forming the combustible first air-fuel mixture before the fuel stream collides against the wall surface of the cavity 3a. On the other hand, when the load is relatively high, the diffusion and mixing of the fuel stream is promoted as the fuel stream hits the wall surface of the cavity 3a and is guided toward the upper space of the cavity 3a. Thus, the comparatively large second air-fuel mixture mass is formed from the interior to the exterior of the cavity 3a. Therefore, the fuel can be effectively combusted under a broad range of engine operation conditions. A control flow executed by the ECU 13 is shown in FIG. 5(a) in accordance with the first embodiment of the present invention. The direct fuel injection engine of the first embodiment is basically configured and arranged to control the fuel injection angle of the fuel stream, and the size of the air-fuel mixture mass in the combustion chamber 4 such that the spark plug 12 ignites the first air-fuel mixture directly after the fuel is injected from the fuel injection valve 11 in the low-load stratified combustion region A, and the spark plug 12 ignites the second air-fuel mixture after the fuel stream is guided to the upper portion of the combustion chamber by the cavity 3a in the high-load stratified combustion region B.

In Step S1 in FIG. 5(a), the ECU 13 is configured to detect the rotational speed and load of the direct fuel injection engine based on input signals from the crank angle sensor, the throttle opening sensor, and the like.

In step S2, the ECU 13 is configured to determine whether to perform stratified combustion mode or homogeneous combustion mode based on the operating condition of the direct fuel injection engine determined based on the signals obtained in step S1. The determination of the combustion mode is made based on a previously stored table containing entries derived by empirically examining the relationship between the rotational speed and load, and the combustion mode. If a determination was made in step S2 to perform the homogeneous combustion mode, then the procedure proceeds to step S6.

On the other hand, if a determination was made in step S2 to perform the stratified combustion mode, then the procedure proceeds to step S3. In step S3 the ECU 13 is configured to determine whether the load of the direct fuel injection engine is greater than or equal to a prescribed load. More specifically, the prescribed load is a threshold value used to decide whether the internal combustion engine is operating in the low-load stratified combustion region A or the high-load stratified combustion region B. The prescribed load is preferably derived empirically and prestored in the ECU 13. Thus, the ECU 13 is configured to select, in accordance with the load of the direct fuel injection engine, whether to form a combustible first air-fuel mixture before the fuel stream collides against the cavity 3a on the piston crown surface, or to form a combustible second air-fuel mixture after the fuel stream collides against the cavity 3a on piston crown surface. In other words, as explained above, in the low-load stratified combustion region A (when the load is lower than the prescribed load), the combustible first air-fuel mixture is formed before the fuel stream collides against the cavity 3a. Thus, the fuel injection angle is set to be relatively large. In the high-load stratified combustion region B (when the load is higher than the prescribed load), a combustible air-fuel mixture is formed after the fuel stream collides against the piston crown surface. Thus, the injection angle is set to be relatively small. Accordingly, if the engine load is greater than or equal to the prescribed load in step S3, then the procedure proceeds to step S4. If the engine load is smaller than the prescribed load in step S3, then the procedure proceeds to step S6.

In step S4, the ECU 13 is configured to select a relatively small fuel injection angle. The procedure then proceeds to step S5, where the ECU 13 is configured to select a large lift of the needle valve 11A to achieve the relatively small fuel injection angle.

On the other hand, in step S6, the ECU 13 is configured to select a relatively large fuel injection angle. The procedure then proceeds to step S7, where the ECU 13 is configured to select a small lift of the needle valve 11A to achieve a relatively large fuel injection angle.

Next, in step S8, the ECU 13 is configured to control the fuel injection angle by outputting a signal that drives the needle valve 11A to lift by a predetermined amount in accordance with an injection parameter determined in steps S5 or S7. Of course it will be apparent to those skilled in the art from this disclosure that in step S8, the ECU 13 can be configured to control other fuel injection parameters including, but not limited to, outputting a signal that drives to the fuel pump 9, which supplies a prescribed fuel pressure.

Figure 5B:
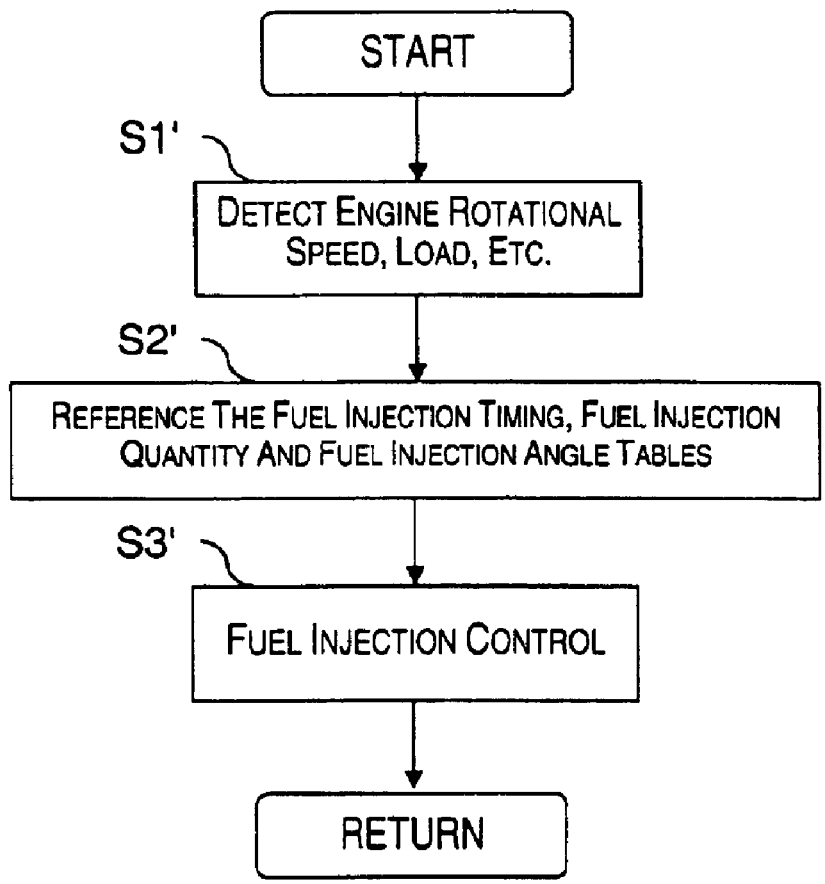

Alternatively, as seen in FIG. 5(b), the control of the direct fuel injection engine of the present invention can be implemented by referencing tables containing the fuel injection timing, fuel injection quantity, and fuel injection angle, which are assigned beforehand for each operating condition. These tables are preferably empirically derived beforehand.

More specifically, in step S1' in FIG. 5(b), the ECU 13 is configured to detect the rotational speed and load of the direct fuel injection engine based on signals from the crank angle sensor, throttle opening sensor, and the like.

Next, in step S2', the ECU 13 is configured to read in the tables wherein the fuel injection timing, fuel injection quantity, and fuel injection angle based on engine operating conditions are prestored. Based on the values set in the tables, the ECU 13 is configured to select, in accordance with the engine load, whether to directly orient the fuel stream toward the vicinity of the spark plug gap, or to form a combustible air-fuel mixture after first colliding against the piston crown surface. More specifically, the ECU 13 is configured to increase the fuel injection angle when orienting the fuel stream directly toward the vicinity of the spark plug gap, and decrease the fuel injection angle when forming a combustible second air-fuel mixture after the fuel stream collides against the cavity 3a of the piston crown surface.

In step S3', in accordance with injection parameters decided in a previous step, the ECU 13 is configured to control the fuel injection by at least outputting a signal that drives the needle valve 11A of the fuel injection valve 11, and the fuel pump 9, which supplies a prescribed fuel pressure.

Accordingly, with the direct fuel injection engine of the first embodiment, a compact first air-fuel mixture mass can be formed in the low-load stratified combustion region A and a relatively large second air-fuel mixture mass can be formed in the high-load stratified combustion region B. Thus, the direct fuel injection engine of the present invention enables stable combustion over a wide load range. In addition, because the fuel stream does not collide against the cavity 3a on the piston crown surface in the low-load stratified combustion region A, the unburned hydrocarbons and cooling losses can be reduced. Thus, the fuel consumption can be improved and the deleterious exhaust emissions can be reduced.

Second Embodiment

Figure 6:
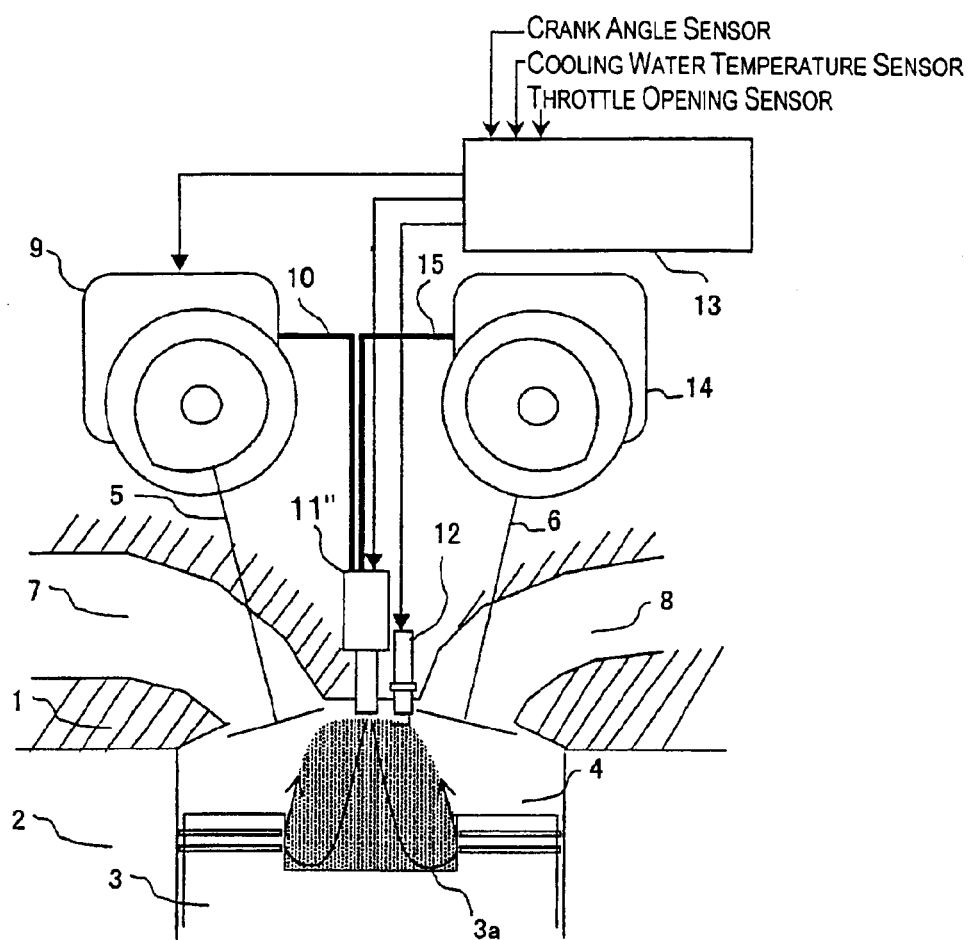
FIG. 6 is a partial cross-sectional view of an injection portion of a direct fuel injection spark ignition internal combustion engine in accordance with a second embodiment of the present invention.

Referring now to FIGS. 6 and 7, a direct fuel injection spark ignition internal combustion engine in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 6 is a partial cross-sectional view of an injection portion of the direct fuel injection engine of the second embodiment. Basically, the direct fuel injection engine of the second embodiment is identical to the first embodiment shown in FIG. 1, except that an air pump 14 is provided at the end of the intake camshaft, and a dual-fluid fuel injection valve 11" is used as the fuel injection valve 11. The air pressurized by the air pump 14 is conveyed to the dual-fluid fuel injection valve 11" via an air conduit 15 and injected into the combustion chamber 4 along with the fuel by the dual-fluid fuel injection valve 11". The dual-fluid fuel injection valve 11' is configured and arranged to inject the fuel and the air separately into the combustion chamber 4 in a predetermined ratio by controlling the lift of a needle valve of the dual-fluid fuel injection valve 11". When the lift of the needle valve is small, the area of the opening of the air nozzle connected to the air pump 14 and facing the dual-fluid fuel injection valve 11' is small or substantially zero (in other words, closed). Thus, the ratio of the mass of the air to the mass of the fuel between the air and fuel injected into the combustion chamber 4 is small. When the lift of the needle valve is large, the area of the opening of the air nozzle is large. Thus, the ratio of the mass of the air to the mass of the fuel increases. Accordingly, the fuel-air mass ratio between the fuel and air injected from the dual-fluid fuel injection valve 11" can be easily varied by varying the amount of air injected from the dual-fluid fuel injection valve 11". The dual-fluid fuel injection valves are conventional components that are well known in the art. Since the dual-fluid fuel injection valves are well known in the art, these structures will not be discussed or illustrated in detail herein.

Figure 7A:
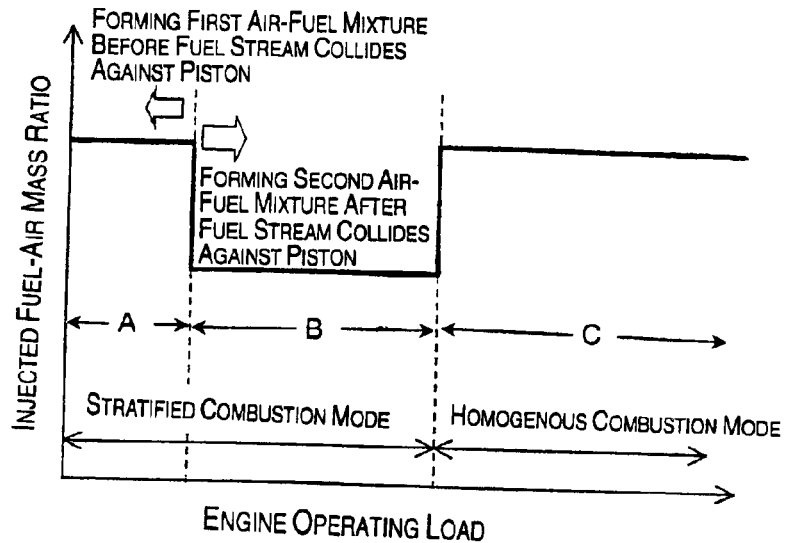
FIG. 7(a) is a diagrammatic chart illustrating the relationship between the engine operating load and the injected fuel mass ratio to the air in accordance with the second embodiment of the present invention.
Figure 7B:
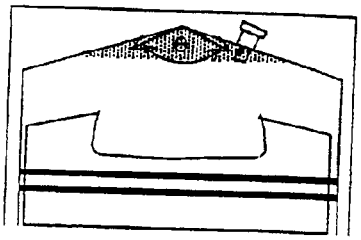
FIG. 7(b) is a diagrammatic cross-sectional view of a combustion chamber illustrating distribution of the air-fuel mixture in the combustion chamber under a low-load stratified combustion region shown as "A" in FIG. 7(a)
Figure 7C:
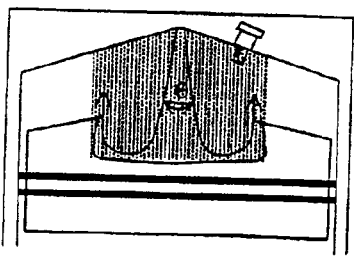
FIG. 7(c) is a diagrammatic cross-sectional view of a combustion chamber illustrating distribution of the air-fuel mixture in the combustion chamber under a high-load stratified combustion region shown as "B" in FIG. 7(a)
Figure 7D:
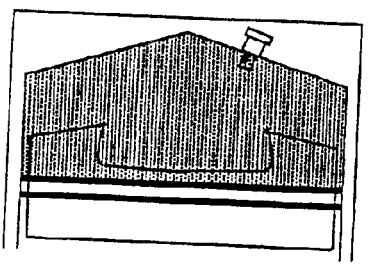
FIG. 7(d) is a diagrammatic cross-sectional view of a combustion chamber illustrating distributions of the air-fuel mixture in the combustion chamber under a homogeneous combustion region shown as "C" in FIG. 7(a)

FIG. 7(a) is a diagrammatic chart illustrating the relationship between the engine operating load and the injected fuel-air mass ratio in accordance with the second embodiment of the present invention. FIGS. 7(b)–7(d) are diagrammatic cross-sectional views of the combustion chamber 4 illustrating distributions of the air-fuel mixture in the combustion chamber 4 under various engine operating regions shown in FIG. 7(a).

As seen in FIG. 7(a), the direct fuel injection engine is configured and arranged to increase the mass ratio of the fuel injected to the air when the direct fuel injection engine is operating in a low-load stratified combustion region A. By increasing the mass ratio of the fuel to the air, the fuel injection angle is increased. Thus, as seen in FIG. 7(b), a first air-fuel mixture having superior ignitability and combustion stability can be formed in the upper center portion of the combustion chamber 4 where the spark plug 12 is located before the fuel stream collides against the cavity 3a of the piston.

On the other hand, as seen in FIG. 7(b), the direct fuel injection engine is configured and arranged to decrease the mass ratio of the fuel to the air injected into the combustion chamber 4 when the direct fuel injection engine is operating in the high-load stratified combustion region B. When the mass ratio of the fuel to the air is decreased, the fuel injection angle becomes smaller. Thus, as seen in FIG. 7(c), comparatively large second air-fuel mixture mass can be formed from the interior to the exterior of the cavity 3a after the fuel stream collides against the bottom surface of the cavity 3a and the diffusion and mixing of the fuel stream is promoted. As explained above, the fuel-air mass ratio between the fuel and air injected from the dual-fluid fuel injection valve 11" can be easily varied by varying the amount of air injected.

In the homogeneous combustion region C, a homogeneous air-fuel mixture fills the combustion chamber 4, as seen in FIG. 7(d). In the second embodiment of the present invention, the fuel mass ratio to the air in the homogeneous combustion mode is preferably set to a relatively large as shown in FIG. 7(a) to achieve a relatively large fuel injection angle. However, it is apparent to those skilled in the art from this disclosure that the fuel mass ratio in the homogeneous combustion region C is not limited to the ratio shown in FIG. 7(a). Rather, the fuel mass ratio in the homogeneous combustion region C can be set to any value as long as the air-fuel mixture that achieves the homogeneous combustion can be formed in the combustion chamber as shown in FIG. 7(d) to carry out the present invention.

Figure 8:
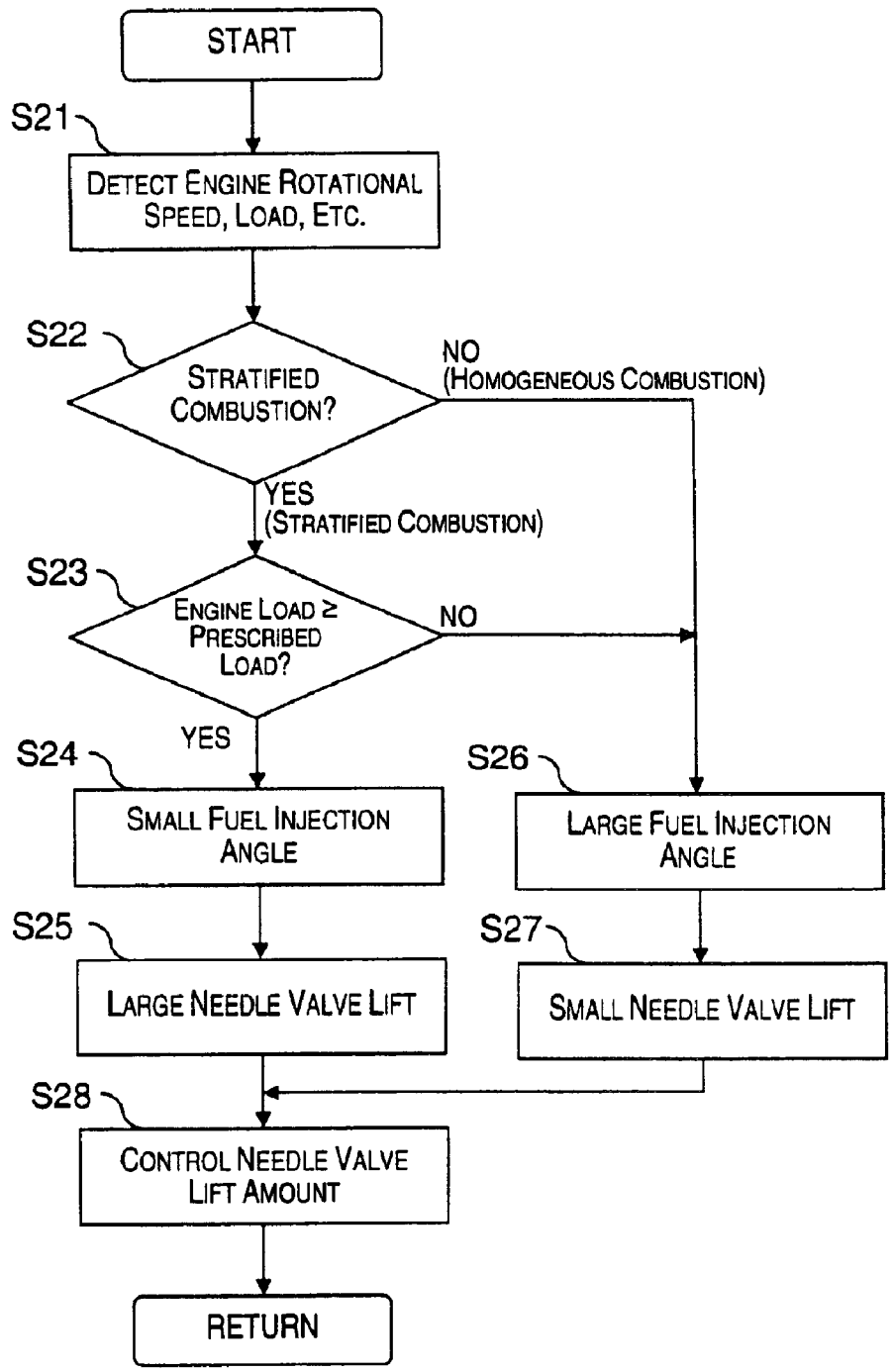
FIG. 8 is a flow chart of the control executed in a controller of the direct fuel injection engine in accordance with the second embodiment of the present invention.

FIG. 8 is a flow chart of the control executed in the ECU 13 of the direct fuel injection engine in accordance with the second embodiment. Steps S21–S23 in FIG. 8 are basically identical to steps S1–S3 in FIG. 5(a) of the first embodiment.

When it is determined in step S22 to perform a homogeneous combustion or when it is determined in step S23 that the load is smaller than the prescribed load (when the direct fuel injection engine is operating in a low-load stratified combustion region A), the ECU 13 is configured to set the fuel injection angle to be a relatively large angle in step S26. Thus, in step S27, the lift of the needle valve of the dual-fluid fuel injection valve 11" is reduced to achieve the relatively large fuel injection angle by reducing the amount of air and increasing the mass ratio of the fuel injected from the dual-fluid fuel injection valve 11". When it is determined in step S24 that the load is greater than the prescribed load (when the direct fuel injection engine is operating in a high-load stratified combustion region B), the ECU 13 is configured to set the fuel injection angle to be a relatively small angle in step S24. Thus, in step S25, the lift of the needle valve of the dual-fluid fuel injection valve 11" is increased to achieve a small fuel injection angle by increasing the amount of air and decreasing the fuel mass ratio of the fuel injected from the dual-fluid fuel injection valve 11".

Accordingly, in the second embodiment of the present invention, the dual-fluid fuel injection valve 11" is used as a fuel injection valve, and the injected liquid-air mass ratio (the mass ratio of fuel) is increased or decreased to control the fuel injection angle. Thus, the fuel injection angle can be varied merely by controlling the dual-fluid fuel injection valve 11" without increasing the complexity of the injection valve structure.

Third Embodiment

Figure 10A:
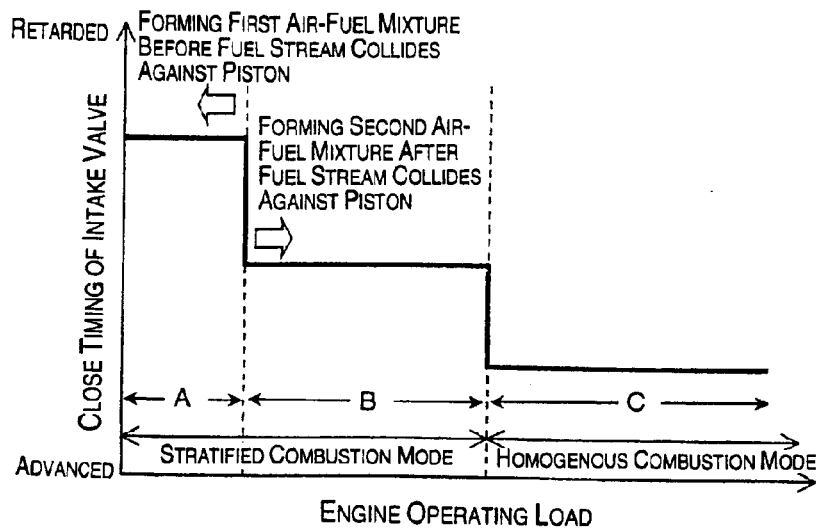
FIG. 10(a) is a diagrammatic chart illustrating another example of the relationship between the engine operating load and the intake valve close timing in accordance with the third embodiment of the present invention.
Figure 10B:
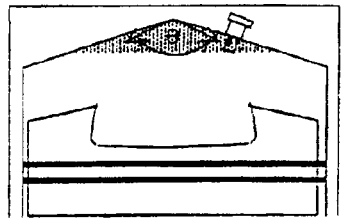
FIG. 10(b) is a diagrammatic cross-sectional view of a combustion chamber illustrating distribution of the air-fuel mixture in the combustion chamber under a low-load stratified combustion region shown as "A" in FIG. 10(a)
Figure 10C:
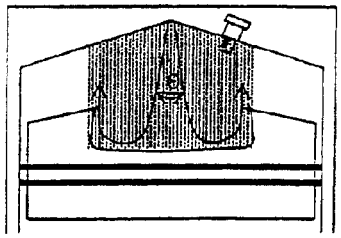
FIG. 10(c) is a diagrammatic cross-sectional view of a combustion chamber illustrating distribution of the air-fuel mixture in the combustion chamber under a high-load stratified combustion region shown as "B" in FIG. 10(a)
Figure 10D:
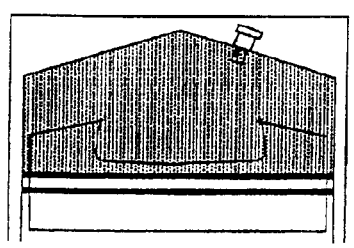
FIG. 10(d) is a diagrammatic cross-sectional view of a combustion chamber illustrating distributions of the air-fuel mixture in the combustion chamber under a homogeneous combustion region shown as "C" in FIG. 10(a)
Figure 11:
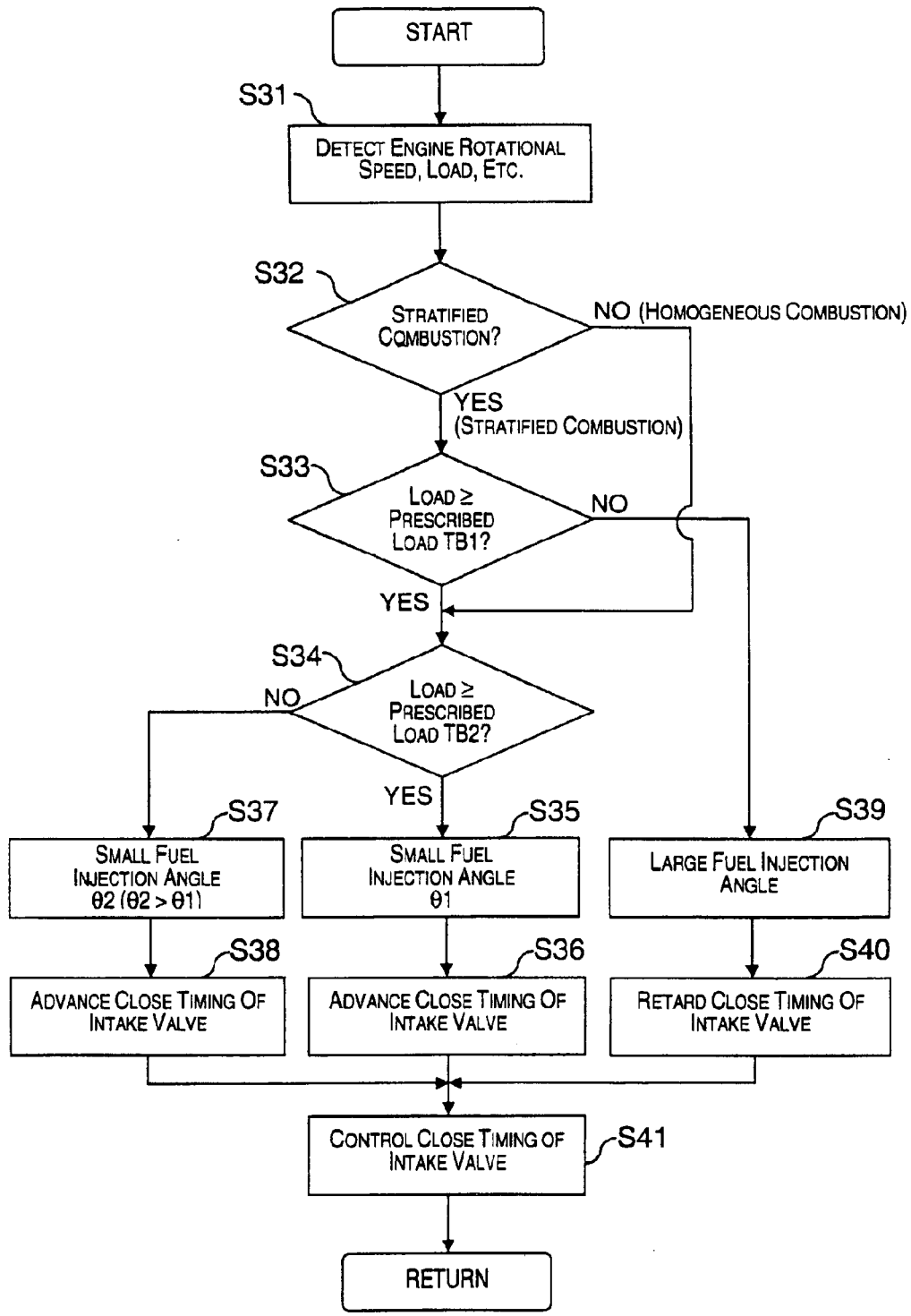
FIG. 11 is a flow chart of the control executed in a controller of the direct fuel injection engine in accordance with the third embodiment of the present invention.

Referring now to FIGS. 9–11, a direct fuel injection spark ignition internal combustion engine in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The direct fuel injection engine of the third embodiment is basically the same as the direct fuel injection engine of the first embodiment, except that the fuel injection angle is varied by controlling a back pressure (pressure inside the combustion chamber 4) at the time when the fuel stream is injected by variably controlling a valve timing of the intake cam, e.g., using the variable valve timing mechanism 5a that is diaramatically shown in FIG. 1. The valve timing of the intake cam can be variably controlled by the variable valve timing mechanism 5a, for example, by varying the phase of the cam or switching between a plurality of cams. Of course, it is apparent to those skilled in the art from this disclosure that the configuration of how to variably control the valve timing of the intake cam is not limited to the above mentioned configurations. Rather, any configuration in which the timing of the valve can be arbitrarily varied can be used in order to carry out the third embodiment of the present invention. Moreover, in the third embodiment of the present invention, any type of fuel injection valves, such as a swirl-type injection valve or a dual-fluid fuel injection valve, can be used as the fuel injection valve 11 provided the fuel injection angle of the fuel stream injected from the injection valve 11 increases as the back pressure (pressure inside the combustion chamber 4) decreases.

Figure 9A:
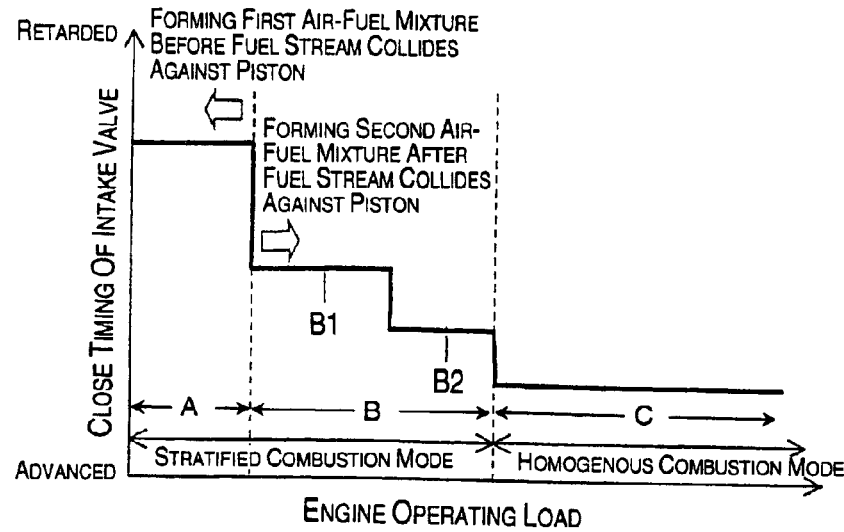
FIG. 9(a) is a diagrammatic chart illustrating one example of the relationship between the engine operating load and the intake valve close timing in accordance with a third embodiment of the present invention.

FIG. 9(a) is a diagrammatic chart illustrating the relationship between the engine operating load and the closing timing of the intake valve 5 in accordance with the third embodiment of the present invention. FIGS. 9(b)–9(e) are diagrammatic cross-sectional views of the combustion chamber 4 illustrating distributions of the air-fuel mixture in the combustion chamber 4 under various engine operating regions shown in FIG. 9(a).

As shown in FIG. 9(a), the closing timing of the intake valve 5 is set to be more retarded when the direct fuel injection engine is operating in the low-load stratified combustion region A. When the closing timing of the intake valve 5 is retarded, the back pressure (pressure inside the combustion chamber 4) is reduced during the compression stroke in which the fuel is injected. Thus, the fuel injection angle increases to a relatively large angle and a combustible air-fuel mixture is formed before the fuel stream collides against the cavity 3a of the piston crown surface. Accordingly, a first air-fuel mixture can be formed having superior ignitability and combustion stability as shown in FIG. 9(b) by retarding the close timing of the intake valve 5 in the low-load stratified combustion region A.

Figure 9B:
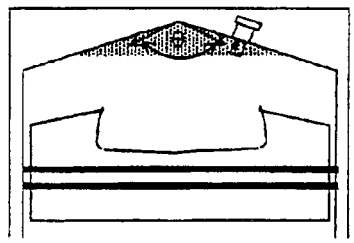
FIG. 9(b) is a diagrammatic cross-sectional view of a combustion chamber illustrating distribution of the air-fuel mixture in the combustion chamber under a low-load stratified combustion region shown as "A" in FIG. 9(a)
Figure 9C:
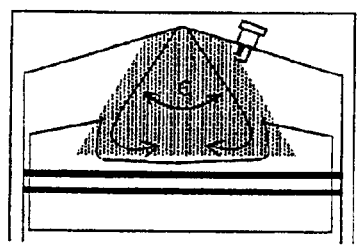
FIG. 9(c) is a diagrammatic cross-sectional view of a combustion chamber illustrating distribution of the air-fuel mixture in the combustion chamber under a high-load stratified combustion region shown as "B1" in FIG. 9(a)
Figure 9D:
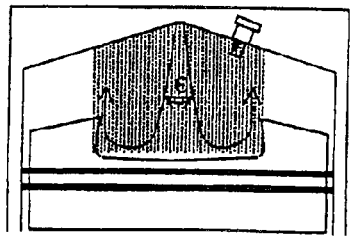
FIG. 9(d) is a diagrammatic cross-sectional view of a combustion chamber illustrating distribution of the air-fuel mixture in the combustion chamber under a high-load stratified combustion region shown as "B2" in FIG. 9(a)

As shown in FIG. 9(b), the closing timing of the intake valve 5 is set to be more advanced in the high-load stratified combustion region B than in the low-load stratified combustion region A. When the closing timing of the intake valve 5 is advanced, the back pressure (pressure inside the combustion chamber 4) is increased. Thus, the fuel injection angle decreases to a relatively small angle such that the fuel stream collides the cavity 3a of the piston crown surface and the diffusion and mixing of the fuel stream is promoted. Accordingly, a comparatively large second air-fuel mixture mass can be formed from the interior to the exterior of the cavity 3a as shown in FIGS. 9(c) and 9(d).

Moreover, in the third embodiment of the present invention, when the load is relatively low in the high-load stratified combustion region B (shown as "B1" in FIG. 9(a)), the closing timing of the intake valve 5 is set to be relatively more delayed so that the fuel injection angle is set to be relatively large. In such a case, the second combustible air-fuel mixture is formed as the fuel stream first collides against the peripheral surface of the cavity 3a and guided toward a center axis of the cavity 3a, as shown in FIG. 9(c). Thus, the fuel stream that is guided from the cavity peripheral wall surface toward the center axis continues to be oriented in the vicinity of the plug gap of the spark plug 12 to form a relatively small stratified air-fuel mixture. Accordingly, more stable combustion is accomplished when the load is relatively low in the high-load stratified combustion region B.

Furthermore, when the load is relatively large in the high-load stratified combustion region B (shown as "B2" in FIG. 9(a)), the closing timing of the intake valve 5 is set to be relatively more advanced so that the fuel injection angle is set to be relatively small. In such a case, the second air-fuel mixture is formed as the fuel stream first collides against the bottom surface of the cavity 3a in the vicinity of the cavity center axis and guided toward the direction of the peripheral surface of the cavity 3a, as shown in FIG. 9(d). Thus, the fuel stream that is guided from the vicinity of the center axis toward the direction of the peripheral wall surface continues to be oriented toward the vicinity of the plug gap of the spark plug 12 to form a relatively large stratified air-fuel mixture mass. Accordingly, a stable combustion can be accomplished in when the load is relatively high in the high-stratified combustion region B.

Figure 9E:
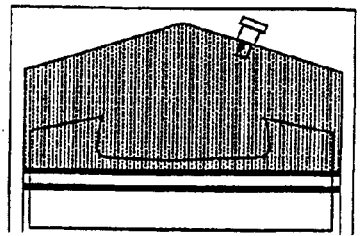
FIG. 9(e) is a diagrammatic cross-sectional view of a combustion chamber illustrating distributions of the air-fuel mixture in the combustion chamber under a homogeneous combustion region shown as "C" in FIG. 9(a)

In the homogeneous combustion region C, a homogeneous air-fuel mixture fills the combustion chamber 4, as seen in FIG. 9(e). Since a large amount of air is needed in the homogeneous combustion mode in the vicinity of full throttle load, the close timing of the intake valve 5 is preferably advanced more than in the high-load stratified combustion region B.

Alternatively, the close timing of the intake valve 5 in the high-load stratified region B can be set as a single value as shown in FIG. 10(a). In such a case, the close timing of the intake valve 5 is set to be relatively advanced so that the fuel injection angle is set to be relatively small. In such a case, the second air-fuel mixture is formed as the fuel stream first collides against the bottom surface of the cavity 3a in the vicinity of the cavity center axis and guided toward the direction of the peripheral surface of the cavity 3a, as shown in FIG. 10(c). Thus, the fuel stream that is guided from the vicinity of the center axis toward the direction of the peripheral wall surface continues to be oriented toward the vicinity of the plug gap of the spark plug 12 to form a relatively large stratified air-fuel mixture mass.

FIG. 11 is a flow chart of the control executed in the ECU 13 of the direct fuel injection engine in accordance with the third embodiment.

In step S31, the ECU 13 is configured to detect the rotational speed and load of the direct fuel injection engine. In step S32, the ECU 13 is configured to determine whether to perform stratified combustion or homogeneous combustion based on the operating conditions of the direct fuel injection engine obtained in step S31. When the ECU 13 determines to perform the homogeneous combustion in step S32, then the procedure proceeds to step S34. In step S34, the ECU 13 is configured to determine whether the engine load is greater than or equal to a prescribed load TB2. Since homogeneous combustion is being preformed, the engine is operating under a high load condition that is greater than the prescribed load TB2. Thus, when homogeneous combustion is being preformed, it is determined in step S34 that the load is greater than or equal to TB2, and then the fuel injection angle is set to a minimum angle in step S35, and the procedure proceeds to step S36. In step S36, the ECU 13 is configured to maximally advance the close timing of the intake valve 5 to minimize the back pressure (pressure inside the combustion chamber 4) during the fuel injection so that the fuel injection angle is controlled to the minimum angle θ1. More preferably, the close timing of the intake valve 5 is preferably advanced more than in the high-load stratified combustion region B because the load in the homogeneous combustion is higher than in the stratified combustion and a greater amount of air is required.

When the ECU 13 determines to perform the stratified combustion in step S32, the procedure proceeds to step S33. In step S33, the ECU 13 is configured to determine whether the load is greater than or equal to a prescribed load TB1. When the load is greater than or equal to TB1, it is determined that the direct fuel injection engine is operating in the high-load stratified combustion region B. Thus, the combustible second air-fuel mixture is formed after the fuel stream first collides against the cavity 3a of the piston crown surface. When the load is less than TB1, it is determined that the direct fuel injection engine is operating in the low-load stratified combustion region A. Thus, a combustible first air-fuel mixture is formed before the fuel stream collides against the cavity 3a of the piston crown surface. As explained above, in order to form the first air-fuel mixture before the fuel stream collides against the cavity 3a of piston crown surface, the fuel injection angle is set to be relatively large. In order to form the second air-fuel mixture after the fuel stream first collides against the cavity 3a of the piston crown surface, the fuel injection angle is set to be relatively small.

Moreover, when the ECU 13 determines in step S33 that the load is greater than or equal to TB1, the procedure proceeds to step S34, where the ECU 13 is configured to determine whether the engine load is greater than or equal to a prescribed load TB2. The prescribed load TB2 is set larger than the prescribed load TB1. When it is determined in step S34 that the load is greater than or equal to TB2, then the fuel injection angle is set to a minimum angle in step S35, and the procedure proceeds to step S36. In step S36, the ECU 13 is configured to advance the close timing of the intake valve 5 to minimize the back pressure (pressure inside the combustion chamber 4) during the fuel injection so that the fuel injection angle is controlled to the minimum angle θ1

When it is determined in step S34 that the load is less than TB2, then in step S37, the fuel injection angle is set to a prescribed angle θ2, which is larger than the minimum angle θ1. The prescribed angle θ2 is set to be a smaller angle than the fuel injection angle used in the low-load stratified combustion region A. Then, in step S38, the close timing of the intake valve 5 is set so that the fuel injection angle becomes the prescribed angle θ2. In other words, the close timing of the intake valve 5 is more retarded than the closing timing used when the load is greater than or equal to the prescribed load TB2. The close timing set in step S38 is more advanced than the close timing used in the low-load stratified combustion region A.

When it is determined in step S33 that the load is lower than the prescribed load TB1, then the fuel injection angle is set to be relatively large in step S39. Then in step S40, the close timing of the intake valve 5 is retarded so that the back pressure (pressure inside the combustion chamber 4) increases to achieve the large fuel injection angle.

In Step 41, the ECU 13 is configured to control the fuel injection angle by outputting a signal that drives the intake valve to the close timing set in accordance with the fuel injection angle determined in the previous steps.

Accordingly, in the third embodiment of the present invention, the fuel injection angle is varied by changing the back pressure by controlling the close timing of the intake valve 5. Thus, the fuel injection angle can be increased or decreased without complicating the structure of the fuel injection valve. Moreover, the fuel injection angle can also be easily varied in various control regions to generate an air-fuel mixture more suited to a particular load condition.

Fourth Embodiment

Figure 12A:
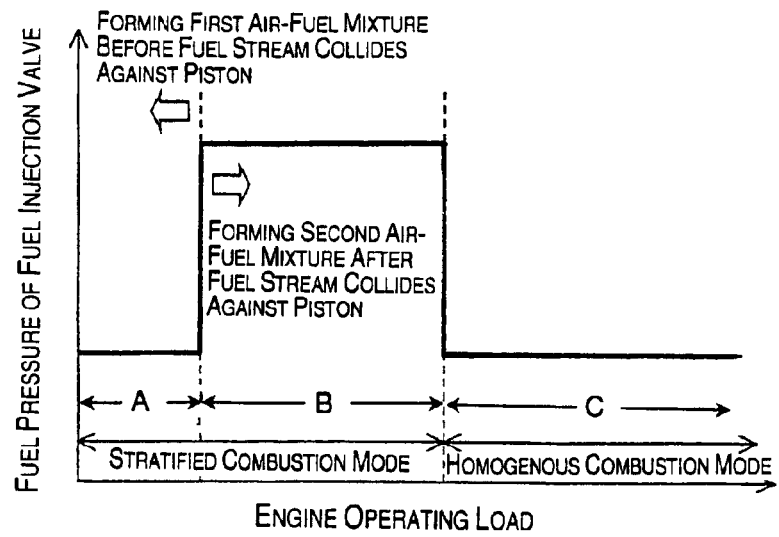
FIG. 12(a) is a diagrammatic chart illustrating one example of the relationship between the engine operating load and the fuel pressure in accordance with a fourth embodiment of the present invention.
Figure 12B:
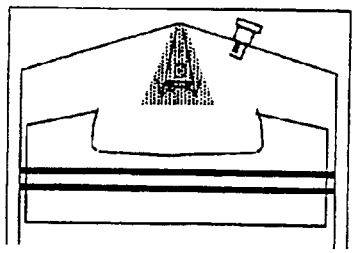
FIG. 12(b) is a diagrammatic cross-sectional view of a combustion chamber illustrating distribution of the air-fuel mixture in the combustion chamber under a low-load stratified combustion region shown as "A" in FIG. 12(a)
Figure 12C:
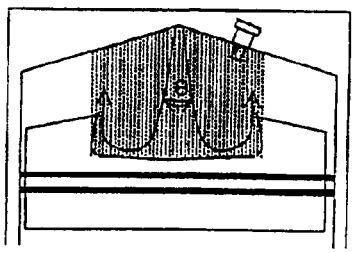
FIG. 12(c) is a diagrammatic cross-sectional view of a combustion chamber illustrating distribution of the air-fuel mixture in the combustion chamber under a high-load stratified combustion region shown as "B" in FIG. 12(a)
Figure 12D:
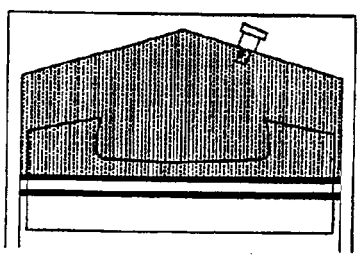
FIG. 12(d) is a diagrammatic cross-sectional view of a combustion chamber illustrating distributions of the air-fuel mixture in the combustion chamber under a homogeneous combustion region shown as "C" in FIG. 12(a)
Figure 13:
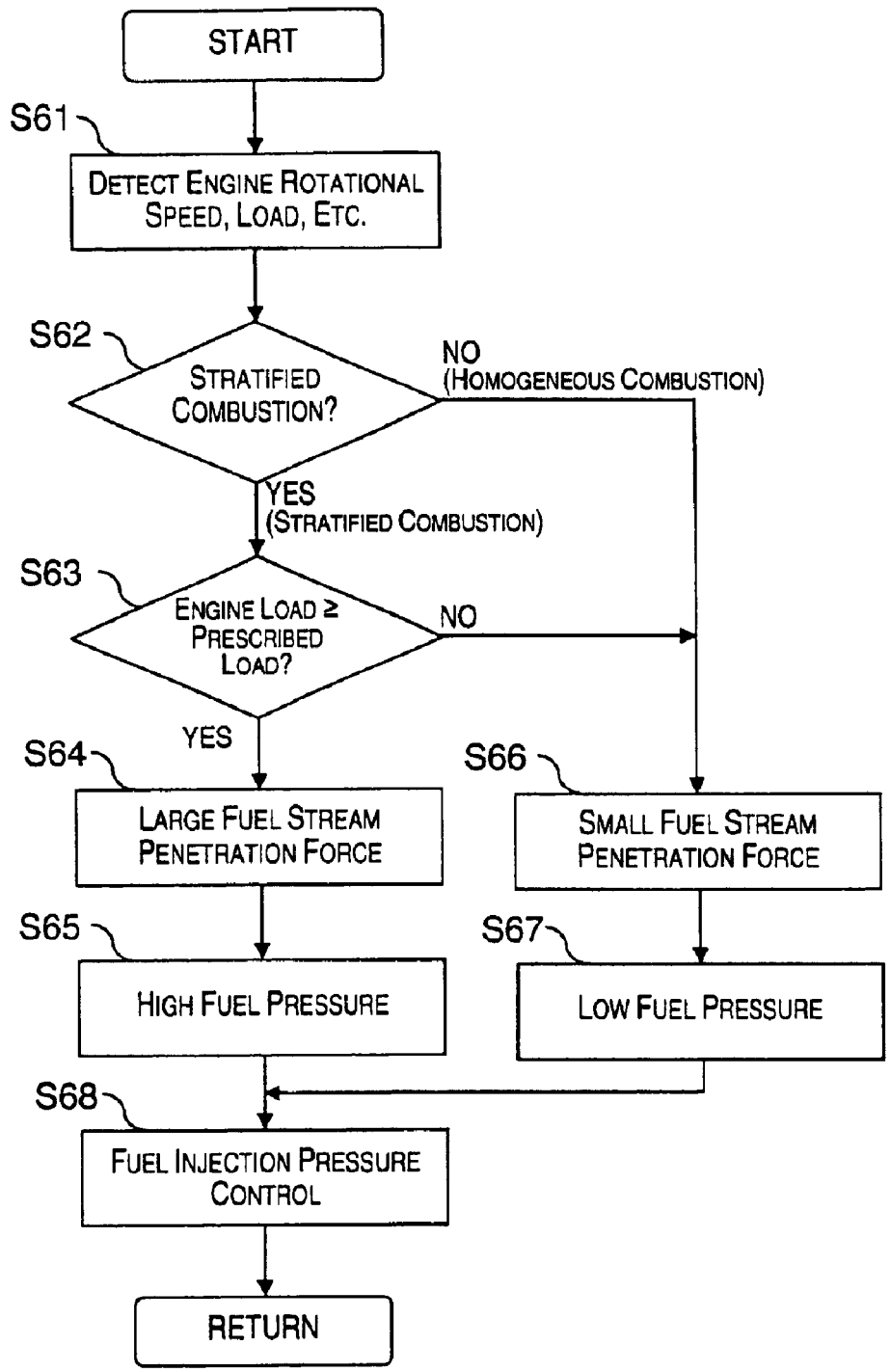
FIG. 13 is a flow chart of the control executed in a controller of the direct fuel injection engine in accordance with the fourth embodiment of the present invention.

Referring now to FIGS. 12 and 13, a direct fuel injection spark ignition internal combustion engine in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The constitution of the direct fuel injection engine of the fourth embodiment is basically the same as that of the first embodiment shown in FIG. 1, except that the fuel pump 9 is further configured and arranged to variably control the fuel pressure. Also, the fuel pump 9 can be arranged to have a fuel pressure sensor to perform a feedback control of the fuel pressure. Moreover, in the fourth embodiment of the present invention, the fuel injection valve 11 is configured and arranged such that the fuel stream penetration force is reduced by lowering the fuel pressure. Thus, the direct fuel injection engine of the fourth embodiment is configured and arranged to control the formation of the first and second air-fuel mixture by varying the fuel stream penetration force. More specifically, when the fuel stream penetration force is small, the first air-fuel mixture is formed before the fuel stream collides against the cavity 3a of the piston. When the fuel stream penetration force is large, the second air-fuel mixture is formed after the fuel stream collides against the cavity 3a of the piston. Thus, in the forth embodiment of the present invention, the fuel pressure is set to be relatively small in the low-load stratified region A to form the first air-fuel mixture, and the fuel pressure is set to be relatively large in the high-load stratified region B to form the second air-fuel mixture. Of course, it will be apparent to those skilled in the art from this disclosure that any type of fuel injection valves, such as a swirl-type injection valve, and a dual-fluid fuel injection valve, can be used as the fuel injection valve 11 provided that the fuel injection valve 11 is configured and arranged to reduce the fuel stream penetration force when the fuel pressure is lowered.

FIG. 12(a) is a diagrammatic chart illustrating one example of the relationship between the engine operating load and the fuel pressure in accordance with the fourth embodiment of the present invention. FIGS. 12(b)–12(d) are diagrammatic cross-sectional views of the combustion chamber 4 illustrating distributions of the air-fuel mixture in the combustion chamber 4 under various engine operating loads shown in FIG. 12(a).

As shown in FIG. 12(a), when the direct fuel injection engine is operating in the low-load stratified combustion region A, the fuel pressure is set to be relatively low so that the fuel stream penetration force is reduced. Thus, the first air-fuel mixture having superior ignitability and combustion stability is formed in the upper center area of the combustion chamber 4 before the fuel stream collides against the cavity 3a of the piston crown surface, as shown in FIG. 12(b).

When the direct fuel injection engine is operating in the high-load stratified combustion region B, the fuel pressure is set to be relatively high so that the fuel stream penetration force is increased. Thus, the fuel stream injected from the fuel injection valve 11 collides against the cavity 3a of the piston and diffusion and mixing of the fuel stream is promoted to form the comparatively large second air-fuel mixture mass in the interior to the exterior of the cavity 3a as shown in FIG. 12(c).

In the homogeneous combustion region C, a homogeneous air-fuel mixture fills the combustion chamber 4, as seen in FIG. 12(d). In the fourth embodiment of the present invention, the fuel pressure in the homogeneous combustion mode is preferably set to be relatively small angle as shown in FIG. 12(a) to achieve a relatively small fuel stream penetration force. However, it is apparent to those skilled in the art from this disclosure that the fuel pressure in the homogeneous combustion region C is not limited to the fuel pressure shown in FIG. 4(a). Rather, the fuel pressure in the homogeneous combustion region C can be set to any value as long as the air-fuel mixture that achieves the homogeneous combustion can be formed in the combustion chamber 4 as shown in FIG. 12(d) to carry out the present invention.

FIG. 13 is a flow chart of the control executed in the ECU 13 of the direct fuel injection engine in accordance with the fourth embodiment of the present invention.

Steps S61 to S63 in FIG. 13 are the same as steps S1 to S3 of the first embodiment shown in FIG. 5(a). When it is determined to perform a homogeneous combustion in step S62 or when it is determined the load is not greater or equal to the prescribed load (when the direct fuel injection engine is operating in the low-load stratified combustion region A) in step S63, the ECU 13 is configured to set the fuel stream penetration force to be relatively small in step S66. When the fuel stream penetration force is set to be relatively small, a combustible first air-fuel mixture is formed in the combustion chamber 4 before the fuel stream collides against cavity 3a of the piston crown surface. Thus, in step S67, the ECU 13 is configured to set the fuel pressure to be relatively low to achieve the relatively small fuel stream penetration force set in step S66. On the other hand, when it is determined the load is greater or equal to the prescribed load (when the direct fuel injection engine is operating in the high-load stratified combustion region B) in step S63, the ECU 13 is configured to set the fuel stream penetration force to be relatively large in step S64. When the fuel stream penetration force is set to be relatively large, a combustible second air-fuel mixture after the fuel stream first collides against the cavity 3a of the piston crown surface. Thus, in step S65, the ECU 13 is configured to set the fuel pressure to be relatively low to achieve the relatively large fuel stream penetration force set in step S64.

In step S68, the ECU 13 is configured to control the fuel stream penetration force by outputting a signal that drives the fuel injection pressure at a prescribed pressure in accordance with the fuel stream penetration force set for each regions as determined in the previous steps.

Accordingly, in the fourth embodiment of the present invention, the fuel stream penetration force is easily varied by changing the fuel pressure.

Alternatively, it is also acceptable to adopt a structure that reduces the nozzle cross sectional area in order to reduce the penetration force of the fuel stream. In such a case too, the fuel stream penetration force is easily varied. Moreover, the atomization of the fuel droplets can be improved when the nozzle cross sectional area is reduced.

Furthermore, strengthening the swirl flow in the combustion chamber 4 can be also alternatively utilized in order to reduce the penetration force of the fuel stream. In such a case too, the fuel stream penetration force is easily varied. Moreover the mixing of the air-fuel mixture is further promoted when the swirl flow in the combustion chamber 4 is strengthened.

Fifth Embodiment

Referring now to FIGS. 14(a)–14(e), a direct fuel injection spark ignition internal combustion engine in accordance with a fifth embodiment will now be explained. In view of the similarity between the fourth and fifth embodiments, the parts of the fifth embodiment that are identical to the parts of the fourth embodiment will be given the same reference numerals as the parts of the fourth embodiment. Moreover, the descriptions of the parts of the fifth embodiment that are identical to the parts of the fourth embodiment may be omitted for the sake of brevity.

The constitution of the direct fuel injection engine of the fifth embodiment is basically same as that of the fourth embodiment, except that the fuel injection valve 11 is a swirl type injection valve, and the fuel pump 9 is configured to control the fuel injection pressure to change the fuel injection angle of the fuel stream injected from the fuel injection valve 11. With the swirl-type fuel injection valve 11, the fuel injection angle increases when the fuel injection pressure increases, and the fuel injection angle decreases when the fuel injection pressure decreases. Thus, in the low-load stratified combustion region A, the fuel injection pressure is increased to increase the fuel injection angle, and thus, a combustible first air-fuel mixture is formed, which is combusted before the fuel stream collides against the cavity 3a. In the high-load stratified combustion region B, the fuel injection pressure is reduced to decrease the fuel injection angle, and thus, a second air-fuel mixture is formed, which is combusted after the fuel stream collides against the cavity 3a and guided to the upper portion of the combustion chamber 4.

Figure 14A:
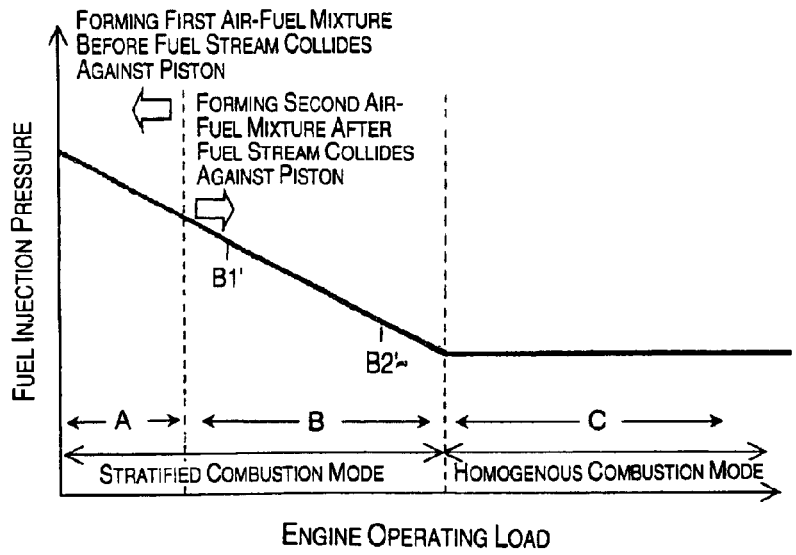
FIG. 14(a) is a diagrammatic chart illustrating another example of the relationship between the engine operating load and the fuel injection pressure in accordance with the fifth embodiment of the present invention.
Figure 14B:
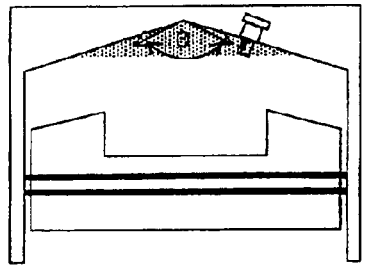
FIG. 14(b) is a diagrammatic cross-sectional view of a combustion chamber illustrating distribution of the air-fuel mixture in the combustion chamber under a low-load stratified combustion region shown as "A" in FIG. 14(a)

FIG. 14(a) is a diagrammatic chart illustrating another example of the relationship between the engine operating load and the fuel injection pressure in accordance with the fourth embodiment of the present invention. FIGS. 14(b)–14(e) are diagrammatic cross-sectional views of a combustion chamber illustrating distributions of the air-fuel mixture in the combustion chamber under various engine operating loads shown in FIG. 14(a).

Figure 14C:
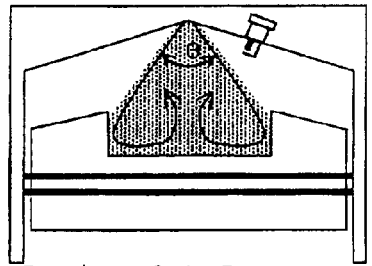
FIG. 14(c) is a diagrammatic cross-sectional view of a combustion chamber illustrating distribution of the air-fuel mixture in the combustion chamber under a high-load stratified combustion region shown as "B1'" in FIG. 14(a)

As seen in FIG. 14(a), the fuel injection pressure is preferably continuously varied in accordance with the engine operating load. More specifically, in the low-load stratified region A, the fuel injection pressure is set to be relatively large, and the fuel injection pressure is reduced as the load increases. Thus, the fuel injection angle in the low-load stratified combustion region A is relatively large, and the fuel injection angle decreases as the load increases. Accordingly, the first air-fuel mixture is formed during the low-load stratified combustion region A before the fuel stream collides against the cavity 3a. When the load is relatively low in the high-load stratified combustion region B (shown as "B1'" in FIG. 14(a)), the fuel injection pressure is set to achieve a fuel injection angle with which the second combustible air-fuel mixture is formed as the fuel stream first collides against the peripheral surface of the cavity 3a and guided toward a center axis of the cavity 3a, as shown in FIG. 14(c). Thus, the fuel stream that is guided from the cavity peripheral wall surface toward the center axis of the piston 3 continues to be oriented in the vicinity of the plug gap of the spark plug 12 to form a relatively small stratified air-fuel mixture. Accordingly, more stable combustion is accomplished when the load is relatively low in the high-load stratified combustion region B.

Figure 14D:
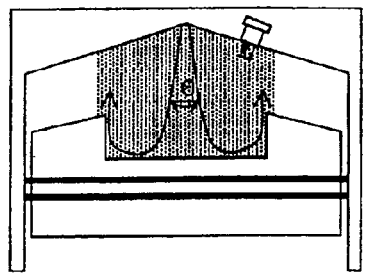
FIG. 14(d) is a diagrammatic cross-sectional view of a combustion chamber illustrating distributions of the air-fuel mixture in the combustion chamber under a homogeneous combustion region shown as "B2'" in FIG. 14(a)
Figure 14E:
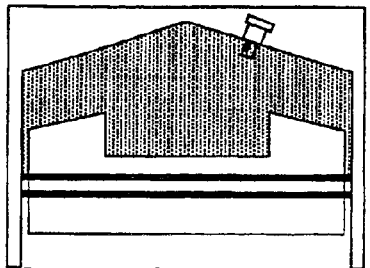
FIG. 14(e) is a diagrammatic cross-sectional view of a combustion chamber illustrating distributions of the air-fuel mixture in the combustion chamber under a homogeneous combustion region shown as "C" in FIG. 14(a)

On the other hand, when the load is relatively high in the high-load stratified combustion region B (shown as "B2'" in FIG. 14(a)), the fuel injection pressure is set to achieve a fuel injection angle with which the second air-fuel mixture is formed as the fuel stream first collides against the bottom surface of the cavity 3a in the vicinity of the cavity center axis and guided toward the direction of the peripheral surface of the cavity 3a, as shown in FIG. 14(d). Thus, the fuel stream that is guided from the vicinity of the center axis of the piston toward the direction of the peripheral wall surface of the cavity 3a continues to be oriented toward the vicinity of a plug gap of the spark plug 12 to form a relatively large stratified air-fuel mixture mass. Accordingly, a stable combustion can be accomplished in when the load is relatively high in the high-stratified combustion region B.

Accordingly, the fifth embodiment of the present invention utilizes a swirl type injection valve as the fuel injection valve 11, and the fuel injection angle can be varied without complicating the structure of the fuel injection valve 11 by varying the fuel pressure (fuel injection pressure).

In addition, when the load is relatively small in the high-load stratified combustion region B, a relatively small second stratified air-fuel mixture is formed because the fuel stream is guided from the peripheral wall surface of the cavity 3a toward the direction of the center axis of the piston. On the other hand, when the load is relatively large in the high-load stratified combustion region B, a relatively large second stratified air-fuel mixture is formed because the fuel stream is guided from the direction of the center axis of the piston toward the peripheral wall surface of the cavity 3a. Thus the second air-fuel mixture that is more suited to a particular engine operating load can be formed. Accordingly, combustion stability and efficiency are improved.

Alternate Shape of Combustion Chamber 4

Figure 15A:
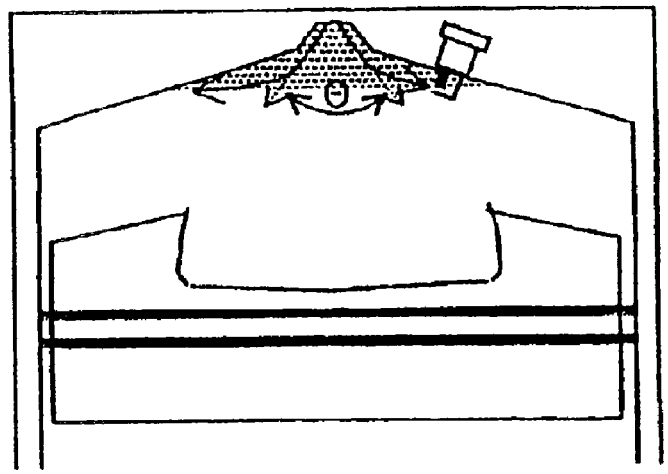
FIG. 15(a) is a diagrammatic view of the combustion chamber illustrating an air-fuel mixture distribution with a counterbore in the vicinity of the fuel injection valve.

In the first to fifth embodiments explained above, the combustion chamber 4 can be arranged to have an alternate shape as shown in FIG. 15(a). More specifically, the alternate shape of the combustion chamber 4 has a conically shaped guide wall (counterbore) around the perimeter of the injection valve 11 or the nozzle thereof, as shown in FIG. 15(a). The guide wall (counterbore) is shaped so that the fuel stream exhibits almost no Coanda effect when the fuel injection angle is small (low fuel pressure, low fuel ratio, high back pressure), and exhibits a large Coanda effect when the fuel stream angle is large (high fuel pressure, high fuel ratio, low back pressure). When there is a large Coanda effect, the more fuel stream is drawn to the guide wall and an upper wall surface of the combustion chamber 4. Thus, the fuel injection angle can more easily be modified by effectively utilizing the Coanda effect by forming the approximately conically shaped counterbore around the perimeter of the fuel injection valve 11.

Figure 15B:
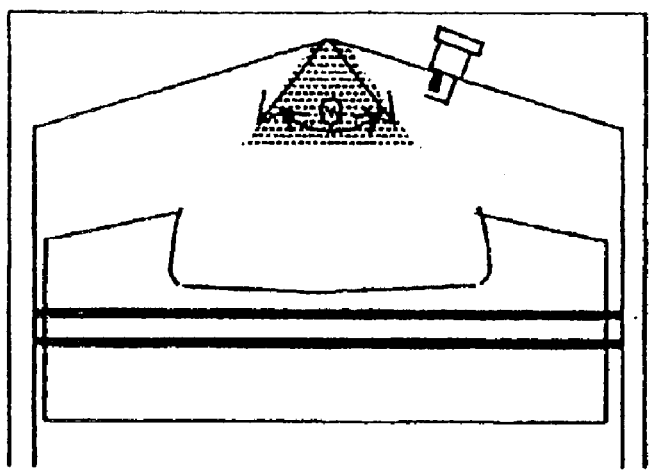

Accordingly, with the alternate shape of the combustion chamber 4, the direct fuel injection engine of the present invention can more effectively vary the fuel injection angle by providing the guide wall (counterbore) in comparison with the shape of the combustion chamber 4 without a guide wall shown in FIG. 15(b), in addition to controlling the fuel injection angle by controlling the fuel pressure, the fuel-air mass ratio, or the back pressure. In particular, because the guide wall (counterbore) is approximately conically shaped, the Coanda effect can by utilized around the entire perimeter of the fuel stream, enabling more effective varying of the fuel injection angle.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2002-374874 and 2003-25914. The entire disclosure of Japanese Patent Application Nos. 2002-374874 and 2003-25914 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A direct fuel injection engine comprising:
   a combustion chamber;
   a spark plug positioned in an upper surface of the combustion chamber;
   a fuel injection valve positioned in a substantially center portion of the upper surface of the combustion chamber, the fuel injection valve being configured and arranged to directly inject a fuel stream inside the combustion chamber;
   a piston having a guide wall surface being configured and arranged to guide the fuel stream injected from the fuel injection valve; and
   a controller configured and arranged to control operations of the spark plug and the fuel injection valve,
   the controller being further configured and arranged to ignite a first air-fuel mixture formed directly after the fuel stream is injected from the fuel injection valve and prior to a majority of the fuel stream being guide by the guide wall surface of the piston when the direct fuel injection engine is operating in a low-load stratified combustion region,
   the controller being further configured and arranged to ignite a second air-fuel mixture formed after a majority of the fuel stream is guided to an upper portion of the combustion chamber by the guide wall surface of the piston when the direct fuel injection engine is operating in a high-load stratified combustion region.

2. The direct fuel injection engine as recited in claim 1, wherein
   the controller is further configured and arranged to ignite the first air-fuel mixture before a tip of the fuel stream injected from the fuel injection valve reaches the piston when the direct fuel injection engine is operating in the low-load stratified combustion region.

3. The direct fuel injection engine as recited in claim 1, wherein
   the piston includes a cavity defined by the guide wall surface, the cavity having a substantially circular horizontal cross sectional shape that is substantially concentric to the fuel stream injected from the fuel injection valve.

4. The direct fuel injection engine as recited in claim 3, wherein
   the guide wall surface comprises a cavity bottom surface and a cavity peripheral wall surface that extends from the cavity bottom surface, the cavity peripheral wall surface being oriented at an angle formed between a piston axis and an approximate direction in which the fuel stream is injected from the fuel injection valve.

5. The direct fuel injection engine as recited in claim 4, wherein
   the controller is further configured and arranged to control the fuel injection valve such that the fuel stream injected from the fuel injection valve first collides against the cavity bottom surface and then is guided by the cavity peripheral wall surface toward the upper portion of the combustion chamber to form the second air-fuel mixture when the direct fuel injection engine is operating in the high-load stratified combustion region.

6. The direct fuel injection engine as recited in claim 4, wherein
   the controller is further configured and arranged to control the fuel injection valve such that the fuel stream injected from the fuel injection valve first hits the cavity peripheral wall surface and then is guided by the cavity bottom surface toward the upper portion of the combustion chamber to form the second air-fuel mixture when the direct fuel injection engine is operating in the high-load stratified combustion region.

7. The direct fuel injection engine as recited in claim 1, wherein
   the controller is further configured and arranged to change control parameters for varying a penetration force of the fuel stream injected from the fuel injection valve, and
   the controller is further configured and arranged to set the control parameters such that the penetration force of the fuel stream when the direct fuel injection engine is operating in the low-load stratified combustion region is smaller than the penetration force of the fuel stream when the direct fuel injection engine is operating in the high-load stratified combustion region.

8. The direct fuel injection engine as recited in claim 7, wherein
   the controller is further configured and arranged to set a fuel pressure such that the fuel pressure when the direct fuel injection engine is operating in the low-load stratified combustion region is lower than the fuel pressure when the direct fuel injection engine is operating in the high-load stratified combustion region.

9. The direct fuel injection engine as recited in claim 1, wherein
   the controller is further configured and arranged to change control parameters for controlling the fuel stream injected from the fuel injection valve, and
   the controller is further configured and arranged to set the control parameters such that the fuel stream reaches in a vicinity of the spark plug directly after the fuel stream is injected from the fuel injection valve when the direct fuel injection engine is operating in the low-load stratified combustion region and that the fuel stream reaches in the vicinity of the spark plug after the fuel stream is guided by the guide wall surface when the direct fuel injection engine is operating in the high-load stratified combustion region.

10. The direct fuel injection engine as recited in claim 9, wherein
    the fuel injection valve is configured and arranged to inject the fuel stream such that the fuel stream forms a circular cone shape, and
    the controller is further configured and arranged to set the control parameters such that a fuel injection angle of the fuel stream when the direct fuel injection engine is operating in the low-load stratified combustion region is larger than the fuel injection angle of the fuel stream when the direct fuel injection engine is operating in a high-load stratified combustion region.

11. The direct fuel injection engine as recited in claim 10, wherein the controller is further configured and arranged to set a fuel pressure such that the fuel pressure when the direct fuel injection engine is operating in the low-load stratified combustion region is higher than the fuel pressure when the direct fuel injection engine is operating in the high-load stratified combustion region.

12. The direct fuel injection engine as recited in claim 10, wherein the controller is further configured and arranged to set a pressure inside the combustion chamber such that the pressure inside the combustion chamber at a time of fuel injection when the direct fuel injection engine is operating in the low-load stratified combustion region is lower than the pressure inside the combustion chamber at a time of fuel injection when the direct fuel injection engine is operating in the high-load stratified combustion region.

13. The direct fuel injection engine as recited in claim 10, wherein the fuel injection valve is a dual-fluid fuel injection valve that injects fuel and air in a predetermined ratio, and the controller is further configured and arranged to set a fuel-air ratio such that the ratio of the fuel to the air is higher when the direct fuel injection engine is operating in the low-load stratified combustion region than when the direct fuel injection engine is operating in the high-load stratified combustion region.

14. The direct fuel injection engine as recited in claim 10, further comprising a combustion chamber guide wall surface having a substantially circular cone shape located in the vicinity of a tip of the fuel injection valve.

15. A direct fuel injection engine comprising:

means for forming a combustion chamber;

ignition means for igniting first and second air-fuel mixtures formed in the combustion chamber;

fuel injection means for directly injecting a fuel stream inside the combustion chamber;

fuel stream guiding means for guiding the fuel stream injected from the fuel injection valve toward in the vicinity of the ignition means; and control means for controlling the ignition means and the fuel injection means to ignite the first air-fuel mixture formed directly after the fuel stream is injected from the fuel injection means and prior to a majority of the fuel stream being guide by the guide means when the direct fuel injection engine is operating in a low-load stratified combustion region, and to ignite a second air-fuel mixture formed after a majority of the fuel stream is guided to an upper portion of the combustion chamber by the fuel stream guiding means when the direct fuel injection engine is operating in a high-load stratified combustion region.

16. A method of operating a direct fuel injection engine comprising:

injecting a fuel stream directly into a combustion chamber;

selectively guiding the fuel stream toward a spark plug;

selectively igniting a first air-fuel mixture formed directly after the fuel stream is injected into the combustion chamber and prior to a majority of the fuel stream being guided back towards the spark plug when the direct fuel injection engine is operating in a low-load stratified combustion region; and selectively igniting a second air-fuel mixture formed after a majority of the fuel stream is guided toward the spark plug when the direct fuel injection engine is operating in a high-load stratified combustion region.

* * * * *